(12) United States Patent
Dantlgraber

(10) Patent No.: US 7,124,581 B2
(45) Date of Patent: Oct. 24, 2006

(54) DRIVE MECHANISM, PARTICULARLY FOR A CLOSING UNIT, AN INJECTION UNIT OR AN EJECTOR OF A PLASTIC INJECTION MOULDING MACHINE

(75) Inventor: Jörg Dantlgraber, Lohr am Main (DE)

(73) Assignee: Bosch Rexroth AG, Lohr/Main (DE)

(*) Notice: Subject to any disclaimer, the term of this patent is extended or adjusted under 35 U.S.C. 154(b) by 752 days.

(21) Appl. No.: 10/343,731

(22) PCT Filed: Jul. 20, 2001

(86) PCT No.: PCT/EP01/08380

§ 371 (c)(1),
(2), (4) Date: Jan. 30, 2003

(87) PCT Pub. No.: WO02/11970

PCT Pub. Date: Feb. 14, 2002

(65) Prior Publication Data

US 2003/0175380 A1    Sep. 18, 2003

(30) Foreign Application Priority Data

Aug. 8, 2000   (DE) ................ 100 39 513
Sep. 18, 2000  (DE) ................ 100 46 461
Oct. 31, 2000  (DE) ................ 100 53 889

(51) Int. Cl.
    *B29C 45/67* (2006.01)
(52) U.S. Cl. ...................... 60/560; 425/589
(58) Field of Classification Search ............ 60/545, 60/560, 563; 425/589, 590
    See application file for complete search history.

(56) References Cited

U.S. PATENT DOCUMENTS

| 4,030,299 A | 6/1977 | Reuschel et al. |
| 5,129,806 A | 7/1992 | Hehl |
| 5,773,050 A * | 6/1998 | Wohlrab ........... 425/450.1 |

FOREIGN PATENT DOCUMENTS

| DE | 4111594 | 10/1992 |
| EP | 0342235 | 11/1989 |

* cited by examiner

*Primary Examiner*—Thomas E. Lazo
(74) *Attorney, Agent, or Firm*—Martin A. Farber

(57) ABSTRACT

A drive mechanism for an injection molding machine has an output element that is moveable in a straight line and an electric motor drive unit having an electric motor and a piston-cylinder unit which has a first piston-cylinder unit in the force chain between the output element of the electric-motor drive unit and the movable component. A rapid actuating movement is possible and, the action of a high force is also achievable wherein a second piston-cylinder unit and a third piston-cylinder unit. A fluidic connection between the first cylinder chamber and the second cylinder chamber is controllable via a valve. When the valve is open, the second hydraulic piston displaces pressurized liquid from the second cylinder chamber into the first cylinder chamber, to actuate the movable component and, when the valve is closed, the third hydraulic piston displaces pressurized liquid from the third cylinder chamber into the first cylinder chamber to exert a high force on the movable component.

20 Claims, 8 Drawing Sheets

DRIVE MECHANISM, PARTICULARLY FOR A CLOSING UNIT, AN INJECTION UNIT OR AN EJECTOR OF A PLASTIC INJECTION MOULDING MACHINE

FIELD AND BACKGROUND OF THE INVENTION

The invention relates to a drive mechanism which is intended to be used particularly for the closing unit or the injection unit or the ejector of a plastics injection molding machine having an output element (54) that can be moved in a straight line and an electric-motor drive unit (50) having an electric motor (51), and having at least a first piston-cylinder unit (12), which has a first cylinder housing (13) and first hydraulic piston (14) which, with a first active surface (18, 19), bounds a first cylinder chamber (16, 17) filled with pressurized liquid and lies in the force chain between the output element (54) of the electric-motor drive unit (50) and the movable component (10, 66).

Inside the closing unit of a plastics injection molding machine, the drive mechanism moves the movable mold clamping plate of the machine. A drive mechanism of this type has to satisfy two important different requirements. Firstly, it is to move the mold clamping plate as quickly as possible in order to close and to open the mold, in order that the cycle time for the production of a molding can be kept short. Secondly, it must be able to hold the mold clamping plate and therefore the entire mold against the high injection pressure with great force. Firstly, therefore, actuating movements have to be carried out at high speed, secondly high forces have to be exerted without significant movement. Apart from on the closing unit, such requirements can also be placed on the ejectors or the injection unit of a plastics injection molding machine. For example, when plastic is injected into the mold, the plasticizing screw is moved at relatively high speed in the direction of the mold until the mold is completely filled with plastic. If the plastic melt located in the mold is then subjected to post-injection pressure, as it is known, then the drive has to apply a high force without substantial movement of the plasticizer screw.

U.S. Pat. No. 4,030,299 discloses a purely hydraulic drive for the movable mold clamping plate of a plastics injection molding machine, which also contains a hydraulic device for force multiplication (a hydraulic force multiplier). The latter has a movable hydraulic piston with a small active surface, a further movable hydraulic piston with a large active surface and a cylinder which, together with the hydraulic pistons, encloses a cylinder chamber filled with a pressurized liquid. The cylinder is arranged in a fixed location on the frame of the injection molding machine. The drive additionally includes hydraulic cylinders which are fed by a hydraulic pump and which move the movable mold clamping plate in order to close and open the mold. When the mold is open, the volume of the cylinder chamber of the hydraulic force multiplier is a minimum. If, then, the movable mold clamping plate is moved by the hydraulic cylinders with the effect of closing the mold, then the large hydraulic piston of the hydraulic force multiplier is carried along as well, the volume of the cylinder chamber of the hydraulic force multiplier being increased and pressure media flowing into the cylinder chamber from a container via a suction follower valve. When the movable mold clamping plate has reached its front end position, the suction follower valve closes. Further pressure medium is supplied to the cylinder chamber of the hydraulic force multiplier by a second hydraulic pump via a directional control valve, as a result of which the pressure in the cylinder chamber rises. When a specific pressure has been reached, the directional control valve is changed over and a hydraulic cylinder that actuates the small hydraulic piston of the hydraulic force multiplier is supplied with pressure medium by the second hydraulic pump. The small hydraulic piston moves into the cylinder chamber, in which a high pressure is produced, which effects a high closing force via the large active surface of the large hydraulic piston. In the drive mechanism according to U.S. Pat. No. 4,030,299, there are therefore various hydraulic drive components for the actuating movement of the movable mold clamping plate and for the exertion of a high force.

A drive mechanism of the introductory-mentioned type is disclosed by DE 41 11 594 A1. In the case of this drive mechanism, a piston-cylinder unit with a hydraulic piston with a large active surface is permanently connected to the movable mold clamping plate. The unit comprising the movable mold clamping plate and piston-cylinder unit can be moved by an electric motor via gear mechanism which comprises a reciprocating spindle and a spindle nut, in order to close the mold quickly and to open it quickly. The high closing force is applied by applying pressure to the piston-cylinder unit that can be moved with the mold clamping plate. In this case, the entire-reaction force is dissipated to the machine frame via the spindle and the spindle nut. Apart from the components of the electric drive, the plastics injection molding machine according to DE 41 11 594 A1 is also equipped with a complete hydraulic system including oil container, pump, valves and piston-cylinder unit.

The invention is based on the object of developing a drive mechanism which has the features of the introductory-mentioned type in such a way that, with little expenditure, on the one hand a rapid actuating movement is possible and on the other hand a high effective force can also be achieved.

SUMMARY OF THE INVENTION

The objective set is achieved by the drive mechanism according to the invention. In the case of such a drive mechanism, for an actuating movement of the movable element of the closing unit, the ejector unit or the injection unit, as a result of moving the large second hydraulic piston, a great deal of pressure medium is displaced from the second cylinder chamber into the first cylinder chamber and, as a result, the first hydraulic piston is moved at high speed. For the actuating movement, particularly for the actuating movement of a movable element in the closing unit or the ejector unit, only a low force is necessary, so that the active surface of the second hydraulic piston can lie in the region of the size of the active surface of the first hydraulic piston, and the distance which the output element of the electric-motor drive unit has to cover during the actuating movement corresponds approximately to the travel of the movable element. In order to exert the high force, only the third hydraulic piston is moved, the high pressure which builds up as a result in the first cylinder chamber owing to the closed valve between the first and the second cylinder chamber not being able to act on the second hydraulic piston and therefore not on the output element of the electric-motor drive either, so that the latter is capable of moving the third hydraulic piston. Apart from the three piston-cylinder units and the valve, other hydraulic components are not needed for a drive mechanism according to the invention.

It should also be pointed out here that, in the patent claims, although mention is made of a movement of a hydraulic piston, this always means a relative movement between a hydraulic piston and the corresponding cylinder housing, which can also be achieved by the hydraulic piston being arranged in a fixed location relative to the machine frame and the cylinder housing being moved relative to the machine frame.

In principle, it is also conceivable, instead of the valve, to provide a mechanical blocking device which supports the second hydraulic piston, following its displacement, against a force exerted on it by the high pressure in the first cylinder chamber, so that this force likewise does not act on the output element of the electric-motor drive. However, the expenditure for a valve appears to be lower than for a mechanical blocking device. In addition, a mechanical form-fitting blocking device would have to be adjustable in order to be able to cover different actuating travels.

It should be pointed out here that the third piston-cylinder unit may be one which can be distinguished by eye from the first piston-cylinder unit. However, the first and third piston-cylinder unit can also be largely integrated in each other. For example, the third hydraulic piston can project into the first cylinder chamber as a plunger piston. The latter is then also to be considered as a third cylinder chamber. The part of the first cylinder housing that serves to guide and seal the third hydraulic piston could be considered a third cylinder housing.

Advantageous configurations of a drive mechanism according to the invention are indicated herein.

For example, it is beneficial if the valve 48 is a valve with a seat, by means of which the first cylinder chamber can be shut off in a leak-free manner with respect to the second cylinder chamber. Then, no pressure medium displaced by the third hydraulic piston is lost, and the pressure in the second cylinder chamber does not rise.

According to a feature of the invention, the second piston-cylinder unit and the third piston-cylinder unit are preferably combined to form a structural unit that can be handled jointly, since both certainly contain a hydraulic piston to be moved by the electric motor. The third hydraulic piston is, then, for example not guided in the first cylinder housing.

In a particularly preferred way, the second piston-cylinder unit and the third piston-cylinder unit are arranged coaxially with one another, so that a displacement of the two appropriate hydraulic pistons can be brought about relatively simply with only one output element that can be moved in a straight line and belongs to the electric-motor drive. In this case, a configuration according is also particularly beneficial with regard to the necessary overall space wherein the third piston-cylinder unit (25) is inside the second piston-cylinder unit (24).

According another feature of the invention, the first hydraulic piston can be moved in two opposite directions by the electric motor. The electric motor is therefore used, for example when used on the closing unit, not only for closing and locking but also for opening the mold. For this purpose, in a particularly simple way, the first hydraulic piston is a differential piston with a first annular cylinder chamber divided off by the first active surface, and the second hydraulic piston is a differential piston with a second annular cylinder chamber divided off by the second active surface. The two annular cylinder chambers are open fluidically in relation to each other. If the electric motor then retracts the second hydraulic piston, then the latter displaces pressure medium from the second annular cylinder chamber into the first annular cylinder chamber, so that the first hydraulic piston is displaced.

In principle, following the end of the actuating movement, no movement takes place, at least on the closing unit, and therefore there is no further reduction in the size of the annular cylinder chamber on the first hydraulic piston. However, taking into account the distortion of the machine parts, it must be assumed that the volume of the first annular cylinder chamber is still reduced. Therefore, not only in the case of the injection unit or the ejector unit but also in the case of the closing unit, it is advantageous if the third hydraulic piston is also a differential piston with a third annular cylinder chamber which is divided off by the third active surface, which is fluidically open to the other annular cylinder chambers.

In addition to plastics injection molding machines in which pressure medium is supplied to that cylinder chamber of a closing cylinder which is on the side facing away from the piston rod, in order to close the mold, there are also machines in which the movable mold clamping plate is pulled up to the stationary mold clamping plate by one or more closing cylinders. The piston rods are then loaded in tension during the actions of closing the mold and holding it shut. Pressure medium is fed to those cylinder chambers of the closing cylinders on the side of the piston rod. According to other features of the invention, in the case of machines of this type, the active direction of the hydraulic pistons is then also reversed on the second piston-cylinder unit and on the third piston-cylinder unit. When the mold is closed, pressure medium is displaced from the cylinder chambers of these piston-cylinder units on the piston-rod side.

On plastics injection molding machines, not only are the movable mold clamping plates for closing the mold moved hydraulically, but also a series of secondary movements, as they are known, of hydraulic cylinders or, expressed generally, of hydraulic motors are carried out. Thus, ejectors or core traction units have to be actuated, or the injection nozzle has to be moved up to the mold and away again following injection. According to still other features of the invention, a displacement element is moved only at the same time as the second hydraulic piston, with which element pressurized fluid can be sucked from a low-pressure storage container into a displacement chamber and forced out of the displacement chamber into a high pressure hydraulic reservoir, from which the hydraulic motors of the secondary movements can he supplied with pressure medium. The displaced element, together with the associated stationary mating piece, forms a type of plunger pump. Such a drive mechanism for a plastics injection molding machine is virtually noiseless, since there is no rotating hydraulic pump with change over operations. Operation with water is possible, since there is no hydraulic pump, which demands a pressure medium with good lubricating properties. In addition, the mechanical construction of a plastics injection molding machine having such a drive mechanism can be identical with that of a hydraulic machine.

In order to be able to move the third hydraulic piston relative to the cylinder housings with the second hydraulic piston and independently of the latter, it is conceivable to provide, between the output element of the electric-motor drive and each hydraulic piston, a coupling device in each case, of which one is made active in order to displace the second hydraulic piston and one in order to displace the third hydraulic piston. Preferably, however, use is made of a coupling device which is arranged between part of the second piston-cylinder unit and the functionally identical part of the third piston-cylinder unit and in whose one state both hydraulic pistons of both piston-cylinder units can be moved relative to the cylinder housings, and in whose other state only the hydraulic piston of the one piston-cylinder unit can be moved relative to the cylinder housing. In particular, by means of the coupling device, the second hydraulic piston and the third hydraulic piston are coupled to each other in a fixed position during the actuating movement of the movable element and can be released from each other in order to exert the high force. Thus, during the actuating movement, not only is the second hydraulic piston but also the third-hydraulic piston displaced. As a result, although the total distance to be covered by the third hydraulic piston but not by the output element of the electric-motor drive is longer than in the case of a construction according to which only the second hydraulic piston is displaced during the actuating movement, only one coupling device is necessary which, in addition, can be constructed very simply and comprises a spring, which is clamped in between the second hydraulic piston and the third hydraulic piston. According to other features of the invention, this spring advantageously forces the two hydraulic pistons together and is then prestressed so highly that, without being stressed further, it is able to transmit the force needed for the actuating movement from the third hydraulic piston to the second hydraulic piston.

However, in the case of a coupling device with a spring, the spring force also has to be overcome when building up the holding force. The loading of the electric motor and a following mechanism can be kept lower if the coupling device is a switchable magnetic coupling.

If, in the case of a construction of the second and of the third hydraulic piston as differential pistons, the higher pressure occurs on average in the cylinder chambers on the side of the piston rod, internal leakage into the cylinder chambers on the side remote from the piston rod will follow. As a result, the second and the third hydraulic piston will drift during operation with the effect of a gradual reduction in the size of the cylinder chambers on the piston rod side. In order to be able to compensate for this drift again, a valve arrangement is provided, via which the two cylinder chambers on both sides of the second hydraulic piston can be connected fluidically to each other, and the two cylinder chambers on both sides of the third hydraulic piston can be connected fluidically to each other. Depending on the magnitude of the leak, the machine can then be set before being started up, for example once per day or once per week. For this purpose, the closing unit is opened completely as far as a mechanical stop. The valve arrangement is then brought into the state in which the cylinder chambers on both sides of the second and of the third hydraulic piston are connected to one another. These hydraulic pistons can then be moved into the position corresponding to the completely opened closing unit. The valve arrangement is then switched into its blocking position again. According to another feature of the invention, a single simple 2/2-way valve is sufficient as the valve arrangement if the two cylinder chambers on the two sides of the first hydraulic piston can be connected fluidically to each other directly via said valve.

In order to ensure a constant quality of the injection molded parts, nowadays the various movement processes on the injection unit of a plastic injection molding machine generally proceed in accordance with pre-defined speed profiles. The electric drive sources used are therefore predominantly electric motors controlled by frequency converters. Frequency converters are still relatively expensive nowadays. According to yet another feature of the invention, therefore, use is made of a single electric motor in order to move both a movable element of the closing unit and a movable element of the injection unit of a plastics injection molding machine. To this end, a coupling is provided in the respective force chain. Only one electric motor and only one frequency converter are then needed, so that a plastics injection molding machine with such a drive mechanism can be produced particularly cost-effectively. The couplings are preferably switchable couplings.

A drive mechanism having other features of the invention can also be used with advantages, without previous mentioned features, since cost-effective production of the plastics injection molding machine already results from the use of a single electric motor for two movement functions.

It is preferable if, according to other features of the invention, a device for force multiplication is arranged in the second force chain between the second output element of the electric-motor drive unit and the injection unit, so that the mechanical loading of the parts of the electric-motor drive is low and the size of the electric motor remains within bounds.

In the case of a plastics injection molding machine, the closing unit and the injection unit are normally arranged on a first axis. To drive two movable elements of the closing unit and the injection unit, it is of quite particular advantage if, the two output elements that can be moved in a straight line and belong to the electric-motor drive unit, and the second piston-cylinder unit and the third piston-cylinder unit, are now arranged on a second axis to the side of the closing unit and injection unit and, for the second force chain, the distance between the two axes is bridged by the force multiplication device. In this way, the closing unit and injection unit, including the electric-motor drive, are very compact. The distance between the two axes may be bridged particularly easily if the force multiplication device is a hydraulic device.

A further simplification of the drive mechanism may be achieved if, the screw can be driven in rotation by the electric motor via a third coupling. Only one electric motor and only one frequency converter are then needed for three different movements on the plastics injection molding machine, so that the machine may be produced particularly cost-effectively.

According to another feature of the invention, a belt drive mechanism, which in particular has a flat belt, is preferably used for the rotational drive of the screw. Such a drive mechanism has a low price, since belt pulleys for a flat belt can be produced easily. In addition, such a belt drive mechanism is also very quiet.

If the electric motor drives the screw in rotation when the second coupling is released and the third coupling is engaged, according to another feature of the invention a back pressure desired during plasticizing can advantageously be set by means of a defined actuation of a brake or by means of defined driving of an electric back-pressure motor or by means of driving a hydraulic back-pressure cylinder, the brake or the back-pressure motor or the back-pressure cylinder opposing a reverse movement of the screw with a resistance needed in order to build up the back pressure.

In the case of a construction according to other features of the invention, the screw drive driven by the electric motor is relieved of high forces. The axial movement can be controlled accurately with a relatively small electric motor.

BRIEF DESCRIPTION OF THE DRAWINGS

A number of exemplary embodiments of a drive mechanism according to the invention are illustrated in the drawings. The invention will now be explained in more detail using these drawings, in which.

Figure 1:
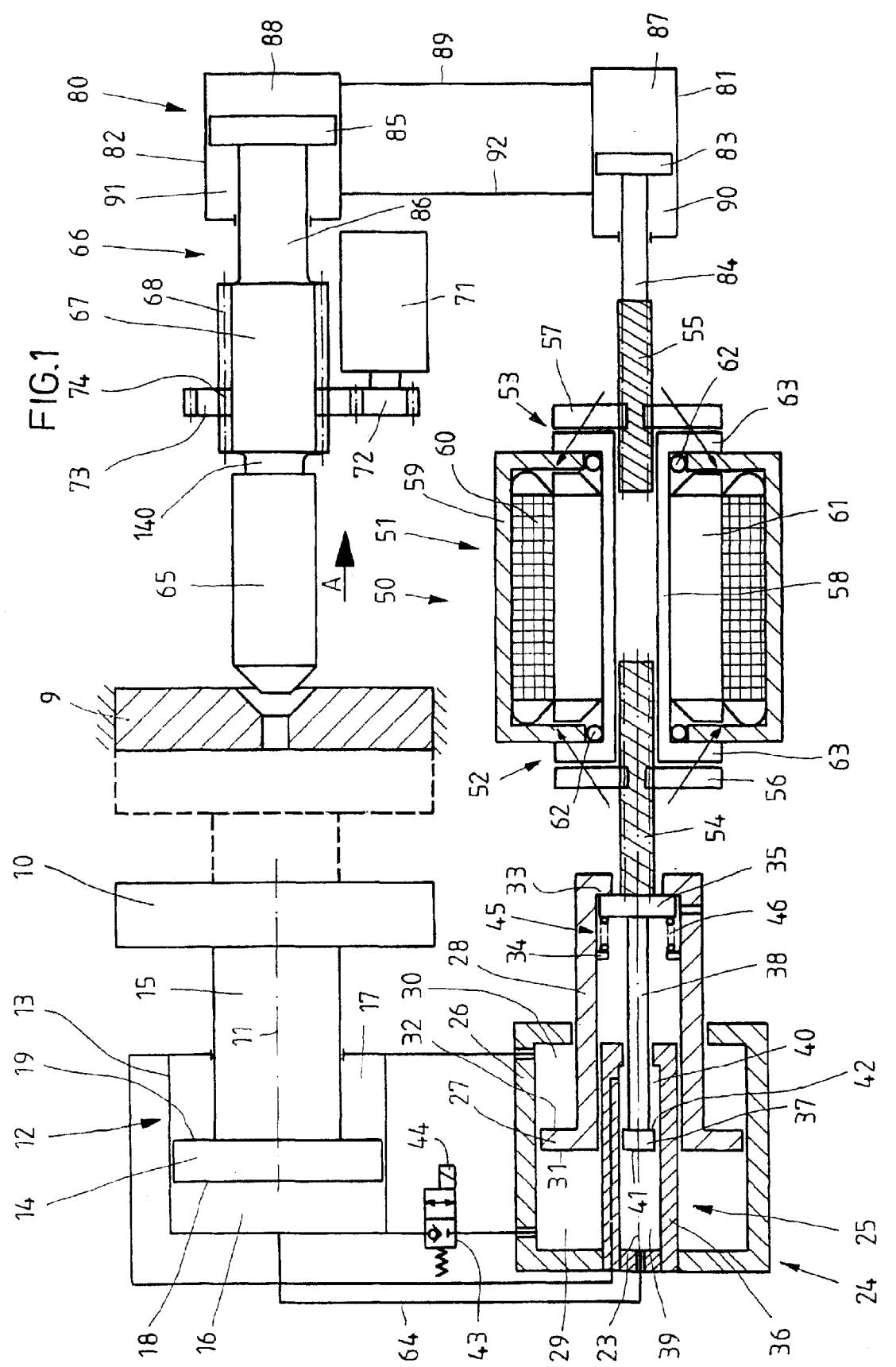
FIG. 1 shows the first exemplary embodiment, in which the first hydraulic piston, the second hydraulic piston and the third hydraulic piston are constructed as differential pistons and, in order to close a mold and hold it closed, the cylinder chambers on the side remote from the piston rod have pressure applied to them and in which the electric-motor drive by which the screw for the injection of plastic can also be moved axially, is arranged on a second axis at the side of the closing unit and injection unit.

According to FIGS. 1 to 4, a plastics injection molding machine has a movable mold clamping plate 10 which, in a manner which is generally known and therefore not specifically illustrated, is guided on a machine frame such that it can move in a straight line with respect to a stationary mold clamping plate 9. Aligned with its axis 11 in the direction of travel is a first piston-cylinder unit 12, which has a first cylinder housing 13 fixed to the frame and a first hydraulic piston 14 with a piston rod 15 which projects out of the cylinder housing and to which the mold clamping plate 10 is fixed. The hydraulic piston 14 is therefore a differential piston, which divides up the interior of the cylinder housing 13 into a cylinder chamber 16 of circularly cylindrical cross section on the side remote from the piston rod and an annular cylinder chamber 17 on the side of the piston rod. The cylinder chamber 16 is adjoined by the hydraulic piston 14 with an active surface 18 shaped like a circular disk, and the cylinder chamber is adjoined by the hydraulic piston 14 with an annular active surface 19. Both cylinder chambers are filled with pressure medium. In order to move the mold clamping plate 10 in the direction to close the mold, a liquid pressure medium, such as mineral oil or silicon oil or water, is supplied to the cylinder chamber 16 and, in order to move the mold clamping plate 10 in the opening direction, it is supplied to the cylinder chamber 17 and displaced from the respective other cylinder chamber.

DETAILED DESCRIPTION OF THE PREFERRED EMBODIMENT

The supply and the displacement of pressure medium is carried out by and to two further piston-cylinder units, namely a second piston-cylinder unit 24 and a third piston-cylinder unit 25. The latter has a third cylinder housing 36 which is fixed to the frame and whose internal diameter is substantially smaller, for example five times smaller, than the internal diameter of the cylinder housing 13. In the cylinder housing 36, a hydraulic piston 37 constructed as a differential piston can move axially, to which a piston rod 38 projecting out of the cylinder housing 36 in a sealed manner is connected and which divides up the interior of the cylinder housing 36 in a sealed manner into a cylinder chamber 39 with a circularly cylindrically cross section and an annular cylinder chamber 40 located on the side of the piston rod 38. The cylinder chamber 39 is adjoined by the hydraulic piston 37 with an active surface 41 shaped like a circular disk, and the cylinder chamber 40 is adjoined by the hydraulic piston 37 with an annular active surface 42. Corresponding to the difference in the internal diameters of the cylinder housings 13 and 36, the active surface 41 of the hydraulic piston 37 is substantially smaller than the active surface 18 of the hydraulic-piston 14. Likewise, the active surface 42 is substantially smaller than the active surface 19.

The piston-cylinder unit 24 is of annularly cylindrical construction and surrounds the piston-cylinder unit 25. It has a second cylinder housing 26 which is fixed to the frame and comprises an outer cylinder wall and an inner cylinder wall. The latter is at the same time the cylinder housing 36 of the piston-cylinder unit 25. In the cylinder housing 26, an annular hydraulic piston 27 constructed as a differential piston can move axially, to which a piston rod 28 projecting from the cylinder housing 26 in the same direction as the piston rod 38 of the hydraulic piston 37 is connected in a manner sealed on the inside and outside. In the same way as the gap between the outer side of the piston rod 28 and the cylinder housing 26 is sealed, the gap between the inner side of the hydraulic piston 27 and the piston rod 28 and the cylinder housing 36 is also sealed. The hydraulic piston 27 divides the interior of the cylinder housing 26 in a sealed manner into a larger annular cylinder chamber 29 on the side remote from the piston rod, and a smaller annular cylinder chamber 30 on the side of the piston rod. The cylinder chamber 29 is adjoined by the hydraulic piston 27 with a large annular active surface 31, and the cylinder chamber 30 is adjoined by the hydraulic piston 27 with a smaller annular active surface 32. The active surface 31 of the hydraulic piston 27 is about the same size as the active surface 18 of the hydraulic piston 14. Likewise, the active surface 32 is approximately the same size as the active surface 19. However, the differences in the active surfaces can also be greater. The piston rod 28 is hollow, encloses the piston rod 38 and, at its free end, has a collar 33 projecting inward.

Figure 4:
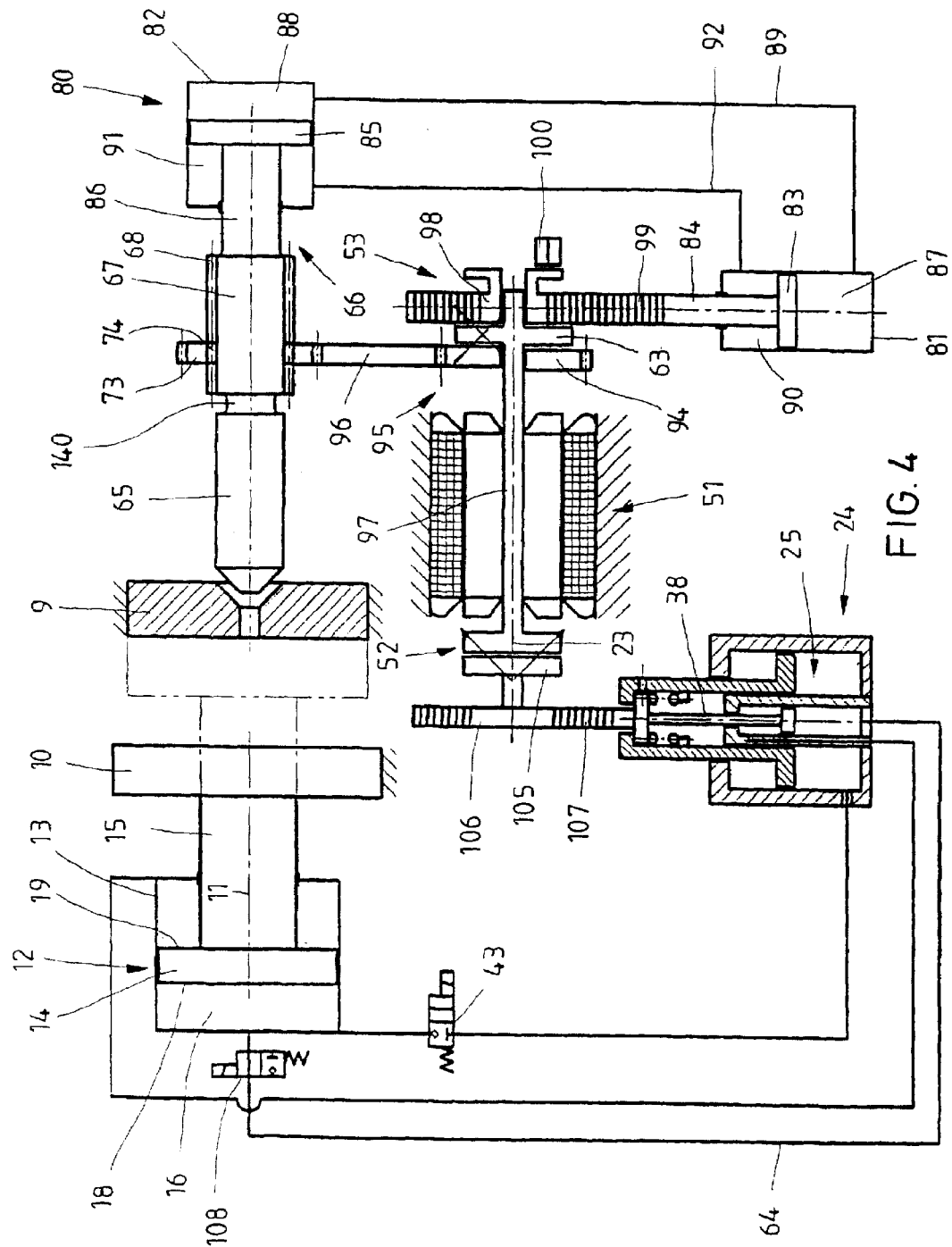
FIG. 4 shows a fourth exemplary embodiment, which differs from that according to FIG. 3 in that the electric motor does not move the screw and the second and the third hydraulic pistons axially via a screw drive in each case but via a rack drive.

The cylinder chambers 16 and 39 of the piston-cylinder units 12 and 25, except for the case of the exemplary embodiment according to FIG. 4, are open fluidically in relation to one another, so that in any operating phase, an interchange of pressurized liquid between them can take place in an unhampered manner. Pressurized liquid can also flow to and fro between the cylinder chambers 16 and 29 of the piston-cylinder units 12 and 24. However, this flow can be controlled with the aid of a 2-way valve 43 with a seat which, in a rest position, closes the connection between the two cylinder chambers 16 and 29 in a leakfree manner and can be switched by an electromagnet 44 into an operating position, in which the connection is open. The pressure prevailing in the cylinder chamber 16 in this case acts in a closing manner on the valve element of the valve 43. In turn, the cylinder chambers 17, 30 and 40 of the piston-cylinder units 12, 24 and 25 are connected to one another in a fluidically open manner.

The two piston rods 28 and 38 are connected mechanically to each other by a coupling device 45. This coupling device comprises a compression spring 46, which is clamped in between a further inner collar 34 on the piston rod 28, at a distance from the inner collar 33, and a disk 35 fixed to the piston rod 38 and located between the two inner collars 33 and 34 on the piston rod 28. The piston rod 38 can therefore carry along the piston rod 28 in one direction with a form fit as a result of contact between the disk 35 and the collar 33. In the other direction, it is possible for the piston rod 28 to be carried along by the piston rod 38 via the compression spring 46 up to a limiting force which is determined by the prestress of the compression spring. Use is made of a compression spring 46 or a spring pack whose prestress changes only slightly when the disk 35 lifts off the collar 33 and approaches the collar 34.

The hydraulic components described hitherto, which are present in largely the same way in all the exemplary embodiments according to FIGS. 1 to 4, can be considered as a hydraulic gear mechanism between the mold clamping plate 10 and an electric-motor drive 50. The exemplary embodiments according to FIGS. 1 and 2 differ primarily in the arrangement of the three piston-cylinder units. In the embodiment according to FIG. 1, the axis 23 of the structural unit comprising the two piston-cylinder units 24 and 25 integrated in each other is at a distance from the axis 11 of the piston-cylinder unit 12. The two axes run parallel to each other. In the direction of the axes, the structural unit comprising the two piston-cylinder units 24 and 25 is located approximately at the height of the piston-cylinder unit 12. The two piston rods 28 and 38 therefore point in the same direction as the piston rod 15. Accordingly, the electric-motor drive, viewed in the direction of the axes 11 and 23, is located in the region of the mold clamping plates and the plasticizing cylinder 65 of the plastics injection molding machine.

Figure 2:
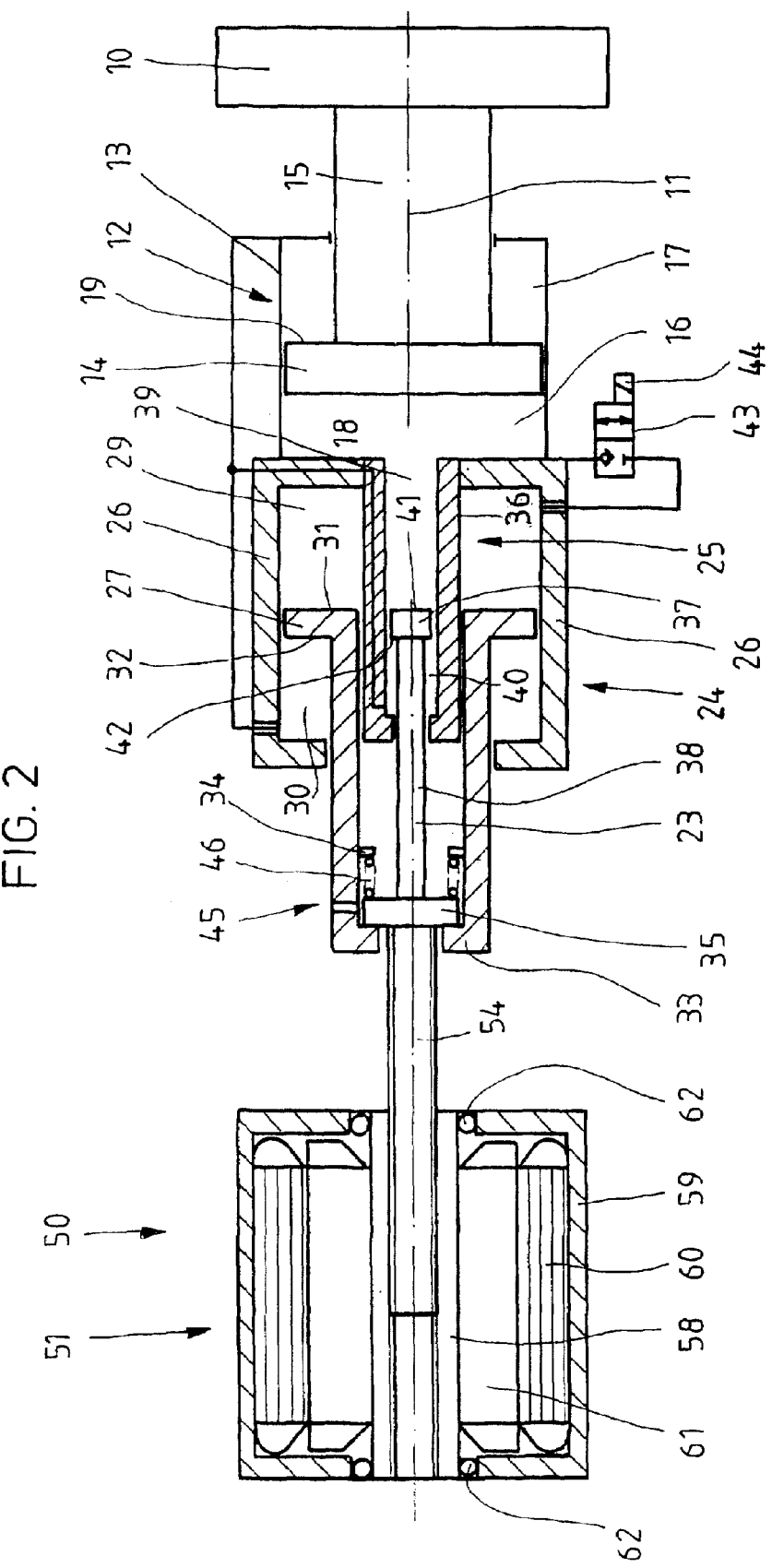
FIG. 2 shows a second exemplary embodiment, in which the electric-motor drive is arranged on the axis of closing unit and injection unit.

In the exemplary embodiment according to FIG. 2, on the other hand, the structural unit comprising the two piston-cylinder units 24 and 25 lies on the axis 11 of the piston-cylinder unit 12 and is fitted directly to this unit 12. In this case, the units can have common housing parts. The cylinder chamber 39 of the piston-cylinder unit 25 in the exemplary embodiment according to FIG. 2 opens directly to the cylinder chamber 16 over its entire cross section. Accordingly, the hydraulic piston 37 can also dip into the cylinder chamber 16 here. Its active surface 14 could even always be located in the cylinder chamber 16, although a large travel would nevertheless be possible as a result of a hollow design of the hydraulic piston 14 and its piston rod 15. In the exemplary embodiment according to FIG. 1, on the other hand, the cylinder chamber 39 is closed by a base. There is only a connecting opening, from which a line 64 leads to the cylinder chamber 16.

The electric-motor drive 50 of the exemplary embodiment according to FIG. 1 comprises an electric motor 51, two switchable couplings 52 and 53 and two screw drives, each of which has a threaded spindle 54 and 55 and a spindle nut 56 and 57, respectively.

The electric motor 51 is located with its axis on the axis 23, and is therefore aligned with the two piston-cylinder units 24 and 25, and is located in front of the side of these two units from which the piston rods 28 and 38 protrude. It is constructed as a hollow shaft motor with a hollow shaft 58 which accommodates the two threaded spindles 54 and 55 such that they can move freely, the threaded spindle 54 projecting out of the hollow shaft in one direction and the other threaded spindle 55 projecting out of the hollow shaft in the opposite direction. The threaded spindle 54 is fixed to the piston rod 38 of the hydraulic piston 37 and to the disk 35. A housing 59 of the electric motor 51, which accommodates a stator with windings 60, is arranged fixed to the frame. The hollow shaft 58 which carries the rotor 61 is rotatably mounted in the housing 59 via two rolling contact bearings 62, which can absorb both radial and axial forces.

The couplings 52 and 53, indicated only schematically, are constructed identically to each other and have, as input element, a disk 63, which is fixed to the hollow shaft 58 so as to be secured against rotation, and as output element the spindle nut 56 (coupling 52) or the spindle nut 57 (coupling 53). The couplings can be actuated, for example, by an electromagnet in each case. If the coupling 52 is engaged, the spindle nut 56 can be rotated in one direction or the other by the electric motor 51, so that the threaded spindle 54 secured against rotation is moved forward or back in a straight line. When the coupling 53 is engaged, movement in a straight line of the threaded spindle 55, likewise secured against rotation, is correspondingly possible.

In the exemplary embodiment according to FIG. 2, the electric-motor drive 50, whose axis coincides with the axes 11 and 23, comprises an electric motor 51, which is in turn constructed as a hollow shaft motor with a hollow shaft 58 but, differing from FIG. 1, accommodates only one threaded spindle, namely the threaded spindle 54 connected to the piston rod 38. The hollow shaft 58 is provided on the inside with a trapezoidal thread or a ball-roller thread. The threaded spindle 54, secured against rotation, carries a corresponding thread on the outside and is coupled to the hollow shaft 58 via the latter. A housing 59 of the electric motor 51, which accommodates a stator with windings 60, is arranged fixed to the frame. The hollow shaft 58 which carries the rotor 61 is rotatably mounted in the housing 59 via two rolling contact bearings 62, which can accommodate both radial and axial forces.

In FIGS. 1 and 2, the drive mechanism for the mold clamping plate is shown in a state in which the mold of a plastics injection molding machine is open. If, then, the mold is to be closed, the electric motor 51 is controlled in such a way that its hollow shaft 58 rotates in a direction such that the threaded spindle 54 moves further out of the hollow shaft. In this case, the coupling 52 is engaged in the exemplary embodiment according to FIG. 1. The threaded spindle 54 displaces the piston rod 38 together with the hydraulic piston 37 and, via the compression spring 46, the hydraulic piston 27 as well. The valve 43 is open. Pressurized liquid is displaced out of the cylinder chambers 29 and 39 into the cylinder chamber 16, so that the piston rod 15 of the hydraulic piston 14 moves out. The resistance opposed by the mold clamping plate 10 to movement is in this case so low that the compression spring 46 is not further compressed, and the disk 35 of the piston rod 38 stays on the collar 33 on the piston rod 28. The movement of the mold clamping plate is rapid since, because of the large active surface 31 of the hydraulic piston 27, a great deal of pressurized liquid is displaced from the cylinder chamber 29. The pressurized liquid displaced out of the cylinder chamber 17 as the piston rod 15 of the hydraulic piston 14 moves out is accommodated by the cylinder chambers 30 and 40 without any increase in pressure.

When the mold is closed and the mold clamping plate 10 assumes the position shown by dashed lines in FIG. 1, the valve 43 closes, so that the pressurized liquid located in the cylinder chamber 29 is blocked in. The pressure in this cylinder chamber therefore rises to the pressurized equivalent to the prestress of the compression spring 46, and the hydraulic piston 27 can no longer be moved onward. Then, only the hydraulic piston 37 with the small active surface 41 is still displaced and, as a result, a high pressure is built up in the cylinder chamber 16, which produces a high closing force for the mold on the large active surface 18 of the hydraulic piston 14. The piston-cylinder units 12 and 25 form a hydraulic force multiplier in the process, which permits the high closing force to be obtained with a relatively small electric motor and with low loading on the screw drive.

In order to open the mold, the electric motor 51 is driven in the opposite direction of rotation, so that the threaded spindle moves back into the hollow shaft 54. In the process, first of all only the hydraulic piston 37 is carried along and, in the process, the pressurized liquid in the cylinder chamber 16 is decompressed. The two hydraulic cylinders 27 and 37 finally move back and displace pressurized liquid out of the cylinder chambers 30 and 40 into the cylinder chamber 17, so that the hydraulic piston 14 pulls back the piston rod 15 and, with the latter, the movable mold clamping plate 10.

In the exemplary embodiment according to FIG. 2, the electric motor 51 serves only to drive a movable element of the closing unit of a plastics injection molding machine. In the exemplary embodiment according to FIG. 1, on the other hand, the electric motor 51 is also used to drive a movable element of an injection unit shown in FIG. 1. The second threaded spindle 55 is present for this purpose.

The injection unit includes a screw 140 which is located within a plasticizing cylinder 65 and is a constituent part of a physical injection shaft 66 which can be driven in rotation and displaced axially. Apart from the screw 140, said shaft comprises a splined shaft 67 with spline grooves 68. Arranged at the side of the splined shaft is a small electric standard motor 71 with speed control which, on its shaft, bears a pinion 72 which meshes with a gear 73 of greater diameter that is seated on the splined shaft 14. Said gear engages with splines 74 in the spline grooves 68 of the splined shaft 67. The splined shaft 67 is therefore firstly coupled to the gear 73 so as to be secured against rotation, but on the other hand can be displaced axially with respect to the gear, which is held in an axially fixed position. The electric motor 71 can therefore drive the screw in rotation irrespective of its axial position.

Axial displacement of the injection shaft 66 is brought about by the electric-motor drive 50. Between its threaded spindle 55 and the splined shaft 67, a hydraulic force multiplier 80 is inserted, which comprises two piston-cylinder units 81 and 82 which are spaced apart from each other and of which the unit 81 lies on the axis 23 and the unit 82 lies on the axis 11. The distance between the two aforementioned axes is therefore bridged by the hydraulic force multiplier 80. The unit 81 has a hydraulic piston which constructed as a differential piston 83 and fixed to the threaded spindle 55 by a piston rod 84, and the unit 82 has a hydraulic piston constructed as a differential piston 85. The piston rod 86 of the latter is fixed to the splined shaft 67. The circularly cylindrical cylinder chambers 87 and 88 of the two units 81 and 82 are connected fluidically to each other via a line 89, and the annular cylinder chambers 90 and 91 are connected fluidically to each other via a line 92. The active surface of the hydraulic piston 83 which faces the cylinder chamber 87 is substantially smaller than the active surface of the hydraulic piston 85 which faces the cylinder chamber 88.

During operation, in order to plasticize plastic, the screw 140 is driven by the electric motor 71 via the splined shaft 67. As a result, plastic compound is conveyed into the space in front of the end of the screw. The screw, and with it the entire injection shaft 66 and the hydraulic piston 85 of the hydraulic force multiplier 80, are loaded rearward in the direction of the arrow A by the back pressure that builds up in the space in front of the screw. For the back pressure, a specific level or a specific level profile is desired. For this purpose, with the coupling 53 engaged, the electric motor 51 has a current applied to it such that a force acting in the direction of the arrow A is exerted on the hydraulic piston 83 of the hydraulic force multiplier 80 via the threaded spindle 55 and spindle nut 57, which are coupled to each other in a self-locking manner. In the cylinder chambers 87 and 88 there is therefore a pressure given by the force exerted by the electric motor 51 and the active surface of the hydraulic piston 63 which adjoins the cylinder chamber 87, said pressure in turn producing on the corresponding active surface of the hydraulic piston 85 a higher force which determines the back pressure. During plasticizing, the screw 140 and the hydraulic piston 85 are moved in the direction of the arrow A, and the hydraulic piston 83 is moved in the direction opposite to the arrow A.

Once sufficient plastic has been plasticized, the electric motor 71 is stopped. The direction of rotation of the electric motor 51 is reversed, so that the threaded spindle 55 and the hydraulic piston 83 move to the right in the direction of the arrow A. The hydraulic piston 83 displaces pressurized liquid out of the cylinder chamber 87 via the line 89 into the cylinder chamber 88. As a result, the hydraulic piston 85 of the force multiplier 80 and, together with it, the injection shaft 66 together with the screw are moved to the left counter to the direction of the arrow A. For this movement, a specific force must be applied by the piston 85. The force to be applied by the electric motor 51 is smaller by a factor which is equal to the ratio between the size of the active surfaces to which pressure is applied. The travel covered by the hydraulic piston 83 is greater by a factor equal to the reciprocal ratio than the travel of the hydraulic piston 85.

During the plasticizing and injection procedure, the coupling 52 is disengaged. The holding pressure for the mold is maintained, since the hydraulic piston 37 is supported axially via the threaded spindle 54 and the spindle nut 56 coupled to each other in a self-locking manner.

Figure 3:
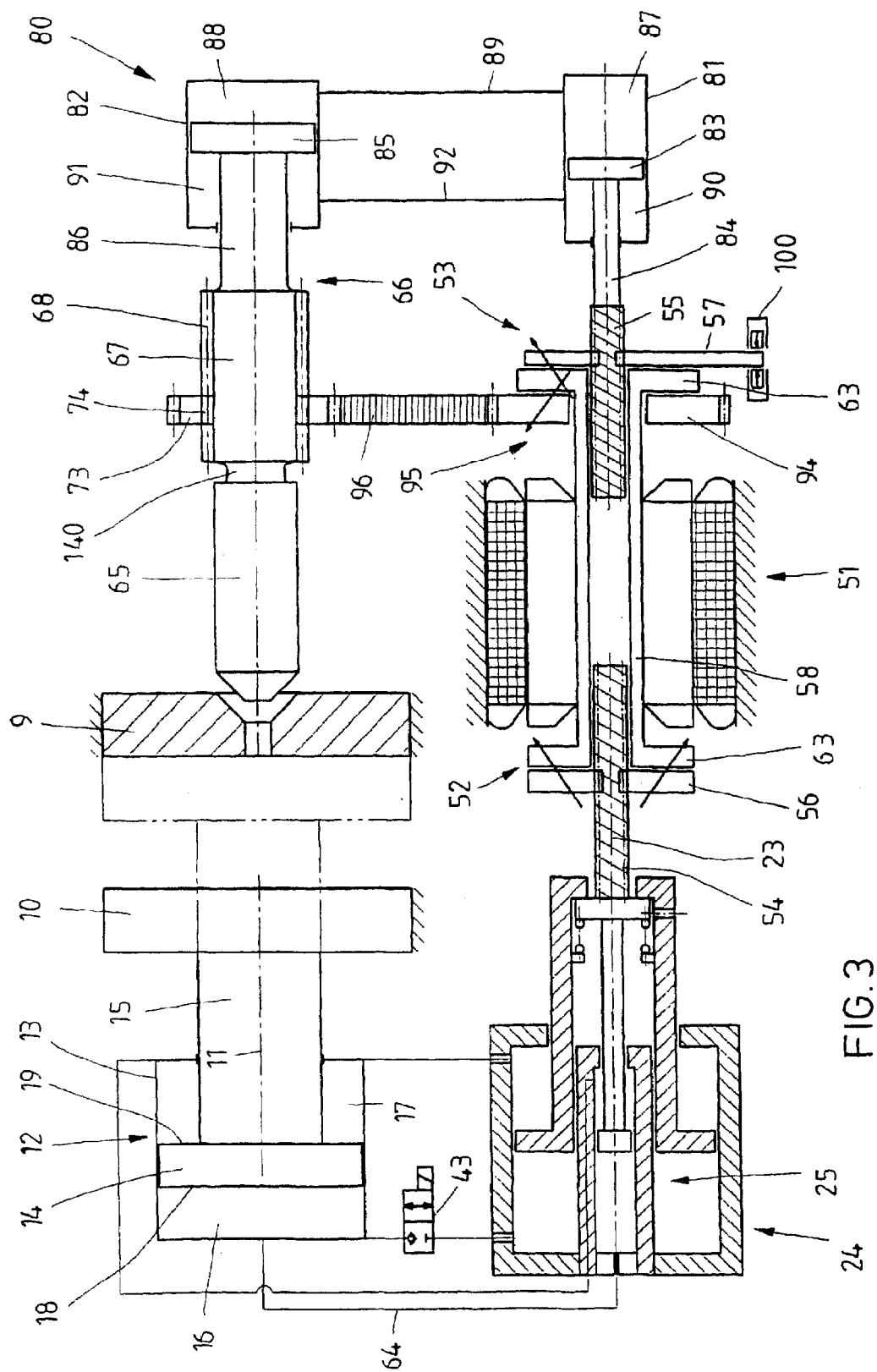
FIG. 3 shows the third exemplary embodiment, which differs from that according to FIG. 1 in that the electric motor both drives the screw in rotation and moves it axially.

In the two embodiments according to FIGS. 3 and 4, as in the embodiment according to FIG. 1, the screw 140 located within a plasticizing cylinder 65 is again a constituent part of an injection shaft 65 which can be driven in rotation and can be displaced axially and comprises a splined shaft 67 with spline grooves 68. Seated on the splined shaft 67 is the gear 73, which engages with splines 74 in the spline grooves 68 of the splined shaft 67. The splined shaft 67 is therefore on the one hand coupled to the gear 63 in a rotationally secure manner but on the other hand can be displaced axially toward the gear 73 held in an axially fixed location. Via the gear 73, therefore, as in the embodiment according to FIG. 1, the screw 140 can be driven in rotation irrespective of its axial position.

Differing from the exemplary embodiment according to FIG. 1, the screw 140 cannot be driven in rotation via the gear 73 by a separate electric motor but by the electric motor 51, by which it can also be moved axially. The position of the electric motor 51 at the side of the injection shaft 66 and the alignment of the motor axis 23 are the same as in the exemplary embodiment according to FIG. 1.

In the exemplary embodiment according to FIG. 3, as in the exemplary embodiment according to FIG. 1, the electric motor 51 has a rotating hollow shaft 58 in order that a threaded spindle 55 which, together with a spindle nut 57 forms a screw drive, can dip in in a space-saving manner. The threaded spindle 55 is again secured against rotation. The spindle nut 57, on the other hand, is the output element from a switching coupling 53 and can be driven in rotation via this and the hollow shaft 58 by the electric motor 51. The input element of the switching coupling 53 forms a coupling disk 63 which, close to the end of the hollow shaft from which the threaded spindle 55 projects, is guided on the hollow shaft 58 such that it can be displaced axially but is fixed against rotation. The spindle nut 57 is located on one side of the coupling disk 63, in front of the end of the hollow shaft, and there engages in the threaded spindle 55. The screw 140 can be moved axially via the threaded spindle 55.

On the other side of the coupling disk 63, a gear 94 is mounted on the hollow shaft 55 such that it is fixed in position axially but can rotate and which is the output element of a third switching coupling 95 which, as input element, has the same disk 63 as the switching coupling 53 or a second disk 63. The gear 94, viewed in the direction of the axes 23 and 11, is exactly at the height of the gear 73. The two gears 73 and 94 are coupled to each other via a toothed belt 96. The diameter of the gear 94 is greater than that of the gear 73, so that an increase in speed is obtained.

In the embodiment according to FIG. 4, the electric motor 51 has a solid motor shaft 97 via which, as with the hollow shaft 58 in the exemplary embodiment according to FIG. 3, the two different movements of the screw 140 can be brought about via switching couplings 53 and 95. The input element of the two switching couplings 53 and 95 is again a coupling disk 63 which, close to one end of the motor shaft 97, is guided such that it can be displaced axially on said shaft but is fixed against rotation. The output element of the switching coupling 95 is again a gear 94, which is coupled to the gear 73 via the toothed belt 96. The output element from the switching coupling 53 is now a further gear 98, which is rotatably mounted on a bearing journal of the motor shaft 97 and engages in a rack 99 which runs at right angles to the motor shaft 97 and via which the screw may be moved axially. The rack drive comprising the gear 98 and the rack 99 in the exemplary embodiment according to FIG. 4, and the screw drive comprising the spindle nut 57 and the threaded spindle 55 in the exemplary embodiment according to FIG. 3 correspond to each other.

Between the threaded spindle 55 and the rack. 99, respectively, and the splined shaft 67, a hydraulic force multiplier 80 is also inserted in the exemplary embodiments according to FIGS. 3 and 4, appears the same as in the exemplary embodiment according to FIG. 1 and has an input piston constructed as a differential piston 83 and fixed via a piston rod 84 to the threaded spindle 55 or to the rack 99, and an output piston constructed as a differential piston 85. The cylinder chamber 87 is located on one side of the piston 83, and the cylinder chamber 90 on the other side. The piston 85 adjoins the cylinder chamber 88, which is connected fluidically to the cylinder chamber 87, and adjoins the cylinder chamber 91 which is connected fluidically to the cylinder chamber 90. A comparison between the two exemplary embodiments according to FIGS. 3 and 4 shows that the hydrostatic force transmission with the force multiplier 80 is associated with high flexibility in the arrangement of individual components, since the two components 81 and 82 of the force multiplier in principle may be associated with each other as desired.

With regard to the drive of the movable mold clamping plate 10, the exemplary embodiment according to FIG. 3 is completely identical with that according to FIG. 1, so that reference can be made here to the appropriate description parts.

By contrast, in the exemplary embodiment according to FIG. 4, an output disk 105 of the first switching coupling 52 can drive a pinion 106 which meshes with a rack 107 which is firmly connected to the piston rod 38 of the hydraulic piston 37. The rack 107 runs in the same direction as the rack 99. Accordingly, the piston-cylinder units 24 and 25 of the exemplary embodiment according to FIG. 4 are arranged to be pivoted through 90 degrees with respect to the exemplary embodiment according to FIG. 1. Here too, the flexibility with regard to the arrangement of the individual components, given by the use of a hydrostatic force transmission device, becomes clear.

As distinct from the exemplary embodiment according to FIG. 1, in that according to FIG. 4, there is also a 2/2-way switching valve 108 in the line 64. By using this valve, the pressurized liquid can be blocked in the cylinder chamber 16 when the high holding pressure has been built up and the coupling 52 has been opened. Holding the mold closed by means of the non-self-locking rack drive 105, 107 would not be possible without an additional mechanical blocking device. Of course, a valve 108 can also be used in the exemplary embodiments according to FIGS. 1 and 3. The screw drive 54, 56 then does not need to be self-locking and is not loaded over a relative long period by force exerted on the piston 37 by the high holding pressure.

In addition, a hydraulic force transmission device of the type designated has the following advantages in particular:

It has a very good efficiency.

As compared with hydraulic force transmission with a pump, it exhibits low noise, since no change over control operations take place.

The wear is low since, as compared with a hydraulic pump, only low relative speeds occur.

Operation with water as pressurized liquid is easily possible, since no hydraulic pump is used, which demands a fluid with good lubricating properties.

Because of the higher elasticity of a pressurized liquid as compared with a metal, high-frequency oscillations (shocks) are damped and in this way the lifetime of the mechanism (rack, screw drive and so on) is lengthened.

A modular construction is possible since, by using different numbers of identical input pistons, different desired speeds of an output piston can be obtained.

In order to plasticize plastic granules, in the exemplary embodiments according to FIGS. 3 and 4 the switching coupling 95 is actuated and the electric motor 51 is driven in rotation in one direction. The gear 94 is driven in rotation via the coupling disk 63, and the screw 140 is driven in rotation via the toothed belt 96 and the gear 73. As a result, plastic material is delivered in front of the end of the screw. There, a back pressure is produced which leads to a reverse movement of the screw and, with the latter, of the piston 85 with the effect of reducing the size of the cylinder chamber 88. Pressurized liquid is displaced out of the cylinder chamber 88 into the cylinder chamber 87 via the line 89 and, as a result, the hydraulic piston 83 including threaded spindle 55 or rack 99 is displaced. This takes place with the switching coupling 53 open. Without any further measures, the back pressure would be undefined. In order to be able to regulate a desired back pressure, in the two exemplary embodiments according to FIGS. 3 and 4, the output element of the switching coupling 53, that is to say the spindle nut 57 or the gear 98, can be braked in a defined manner by a brake 100, so that the output element 57 or 98 may rotate only against a resistance. This resistance can be varied by braking of different intensity, in order to obtain the desired back pressure. The back pressure may be registered, for example, by means of a measurement of the pressure prevailing in the cylinder chambers 88 and 87.

Instead of a brake 100, a (small) electric back-pressure motor can also be used, by which a torque is exerted on the spindle nut 57 or on the gear 98.

In order to close the mold, in the two exemplary embodiments according to FIGS. 3 and 4, the coupling 52 is actuated, while the two couplings 53 and 95 are disengaged. Otherwise, the closing operation proceeds as in the exemplary embodiment according to FIG. 1.

In order to inject plastic into the mold, the switching coupling 95 is open and the switching coupling 53 is actuated. The electric motor 51 is driven in rotation in a direction such that the threaded spindle 55 or the rack 99 moves the piston rod 84 into the cylinder housing of the piston-cylinder unit 81. The hydraulic piston 83 displaces pressurized liquid out of the cylinder chamber 87 via the line 89 into the cylinder chamber 88. As a result, the output piston 85 of the force multiplier 80 and, with it, the injection shaft 66 together with the screw 140, are moved to the left in the view according to FIGS. 3 and 4. For this movement, a specific force must be applied by the hydraulic piston 85. The force to be applied by the electric motor 51 is smaller by a factor which is equal to the ratio between the size of the active surfaces of the two hydraulic pistons 85 and 83. The travel covered by the input piston 83 is greater by a factor equal to the reciprocal ratio than the travel of the output piston 85. By means of registering pressure in one of the cylinder chambers 87 and 88 of the hydraulic force multiplier, a desired injection pressure can be maintained accurately.

As a variant of the two exemplary embodiments according to FIGS. 3 and 4, a drive mechanism is conceivable in which the switching coupling 53 is replaced by a continuously adjustable coupling, there then being two input elements for the two couplings. Then, during plasticizing, a back pressure could be set by means of an appropriate actuation of the coupling 53. To this end, for the purpose of plasticizing, the electric motor 51 then rotates in a direction which is opposite to the direction of rotation of the spindle nut 57 or the gear 98 when the threaded spindle 55 or the rack 99 is moving back.

In a way similar to that in the two exemplary embodiments according to FIGS. 3 and 4, a brake or a small back-pressure motor can also be used in those according to FIG. 1, acting on the spindle nut 57 in order to set a back pressure in the plasticized plastic material. The coupling 53 would then be disengaged during plasticizing. The electric motor could already displace the hydraulic pistons 27 and 37 via the actuated coupling 52 during plasticizing, in order to close the mold.

Figure 5:
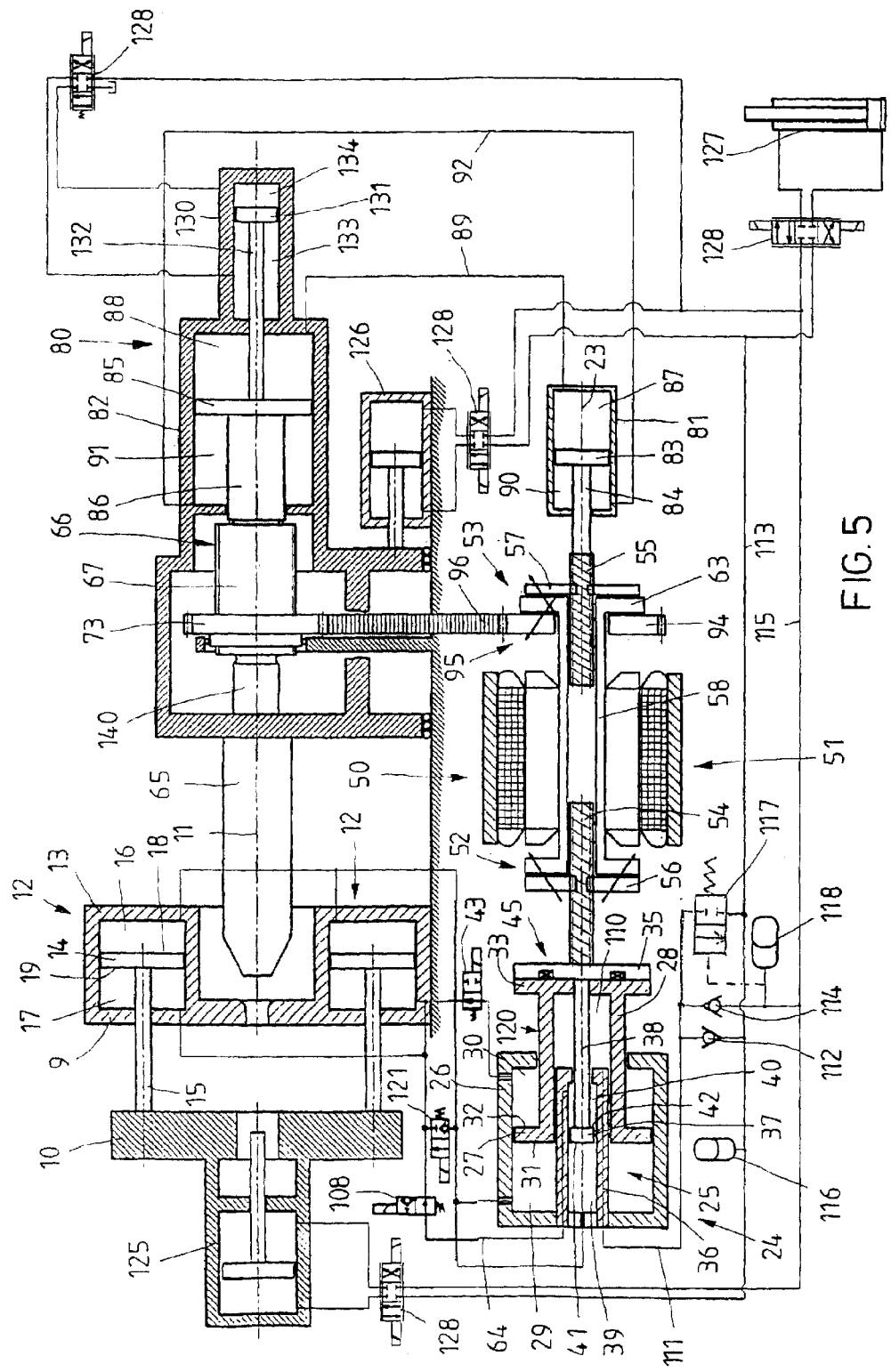
FIG. 5 shows a fifth exemplary embodiment, in which, as in the preceding exemplary embodiments, the first hydraulic piston, the second hydraulic piston and the third hydraulic piston are constructed as differential pistons but, in order to close a mold and hold it closed, the cylinder chambers on the piston rod side have pressure applied to them, and in which, in addition, there is a plunger pump to supply pressure medium from other hydraulic loads.
Figure 6:
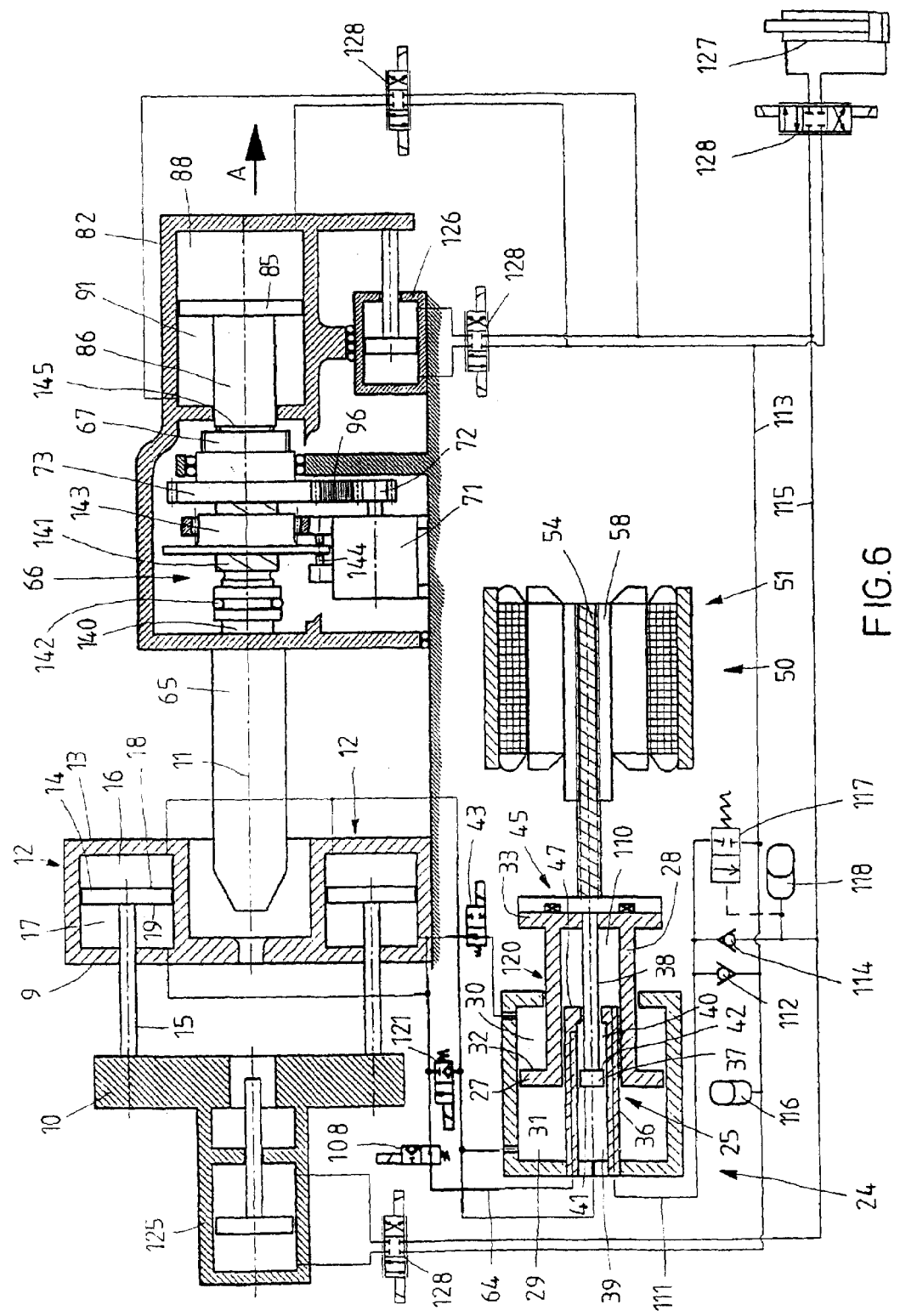
FIG. 6 shows a sixth exemplary embodiment, which differs from that according to FIG. 5 in that, in a manner similar to that in the exemplary embodiment according to FIG. 1, a second electric motor is used for plasticizing.

In the exemplary embodiments according to FIGS. 5 and 6, it is also true that a plastic injection molding machine has a movable mold clamping plate 10, which is guided on a machine frame such that it can be moved in a straight line with respect to a stationary mold clamping plate 9. Aligned with their axes in the direction of travel and mutually diametrically opposite with respect to the mid-axis 11 of the mold, two first piston-cylinder units 12 each having a first cylinder housing 13 and a first hydraulic piston 14 are fixed to the stationary mold clamping plate 9. A piston rod 15 on each hydraulic piston 14 goes through the stationary mold clamping plate 9 and is fixed at its end to the movable mold clamping plate 10. Each hydraulic piston 14 is therefore again a differential piston, which divides the interior of its cylinder housing 13 into a cylinder chamber 16 of circularly cylindrical cross section on the side remote from the piston rod and an annular cylinder chamber 17 located on the side of the piston rod. The hydraulic piston 14 adjoins the cylinder chamber 16 with an active surface 18 shaped like a circular disk, and adjoins the cylinder chamber with an annular active surface 19. Both cylinder chambers 16 and 17 are filled with pressure medium. Differing from the exemplary embodiments according to FIGS. 1 to 4, a liquid pressure medium is supplied to the cylinder chambers 17 in order to move the mold clamping plate 10 in the direction of closing the mold, and is supplied to the cylinder chambers 16 of the piston-cylinder units 12 in order to move the mold clamping plate in the opening direction, and is displaced from the respective other cylinder chambers. When the mold is being closed and held closed, therefore, the piston rods 15 are stressed in tension, and when the mold is opened they are stressed in compression.

The supply and the displacement of pressure medium is carried out, as in the exemplary embodiments according to FIGS. 1 to 4, from and to a second piston-cylinder unit 24 and a third piston-cylinder unit 25, which are largely constructed in the same way as the exemplary embodiments according to FIGS. 1 to 4. Accordingly, the latter unit 25 again has a cylinder housing 36 which is fixed to the frame and whose internal diameter is substantially smaller, for example three times smaller, than the internal diameter of each cylinder housing 13. In the cylinder housing 36, a hydraulic piston 37 constructed as a differential piston can move axially, to which a piston rod 38 projecting out of the cylinder housing 36 is connected and which divides the interior of the cylinder housing 36 in a sealed manner into a cylinder chamber 39 of circularly cylindrical cross section on the side remote from the piston rod, and an annular cylinder chamber 40 on the side of the piston rod. The hydraulic piston 37 adjoins the cylinder chamber 39 with an active surface 41 shaped like a circular disk, and adjoins the cylinder chamber 40 with an annular active surface 42. In accordance with the difference in the internal diameters of the cylinder housings 13 and 36, the active surface 42 of the hydraulic piston 37 is substantially smaller than the active surface 19 of the hydraulic pistons 14. Likewise, the active surface 41 is substantially smaller than the active surfaces 18.

The piston-cylinder unit 24 is of annularly cylindrical construction and surrounds the piston-cylinder unit 25. It has a cylinder housing 26 which is fixed to the frame and which comprises an outer cylinder wall and an inner cylinder wall. The latter is at the same time the cylinder housing 36 of the piston-cylinder unit 25. In the cylinder housing 26, an annular hydraulic piston 27 constructed as a differential piston can move axially, to which a bush-like piston rod 28 protruding from the cylinder housing 26 in the same direction as the piston rod 38 of the hydraulic piston 37 is connected, and which divides up the interior of the cylinder housing 26 in a sealed manner into a larger annular cylinder chamber 29 on the side remote from the piston rod and a smaller annular cylinder chamber 30 located on the side of the piston rod 28. The hydraulic piston 27 adjoins the cylinder chamber 29 with a large annular active surface 31, and adjoins the cylinder chamber 30 with a smaller annular active surface 32. The active surface 31 of the hydraulic piston 27 is approximately as large as the sum of the active surfaces 18 of the hydraulic pistons 14. Likewise, the active surface 32 is approximately as large as the sum of the active surfaces 19. The piston rod 38 emerges in a sealed manner from the cylinder housing 36 at one end 47 and then runs inside the hollow, bush-like piston rod 28. Differing from the exemplary embodiments according to FIGS. 1 to 4, the piston rod 38 leaves the hollow piston rod 28 in a sealed manner through a cover, which corresponds to the inner collar 33 of the exemplary embodiments from FIGS. 1 to 4 and is therefore likewise provided with the reference number 33. The cover 33 is enlarged radially beyond the outer circumference of the piston rod 28. Once more, like the gap between the outer side of the piston rod 28 and the cylinder housing 26, the gap between the inner side of the hydraulic piston 27 and the piston rod 28 and the cylinder housing 36 is also sealed.

Thus, within the hollow piston rod 28 and axially between the end 47 of the cylinder housing 36 and the cover 33 of the piston rod 28, a closed displacement chamber 110 is created, whose volume decreases when the piston rod 28 moves in and whose volume increases when the piston rod 28 moves out. The movement of the piston rod 38 has no influence on the volume of the displacement chamber. The latter, like the cylinder chambers of the piston-cylinder unit 12, 24 and 25, is filled with pressure medium. To the displacement chamber 110, to some extent through the cylinder housing 36, there leads a line 111 which, via a nonreturn valve 112 opening toward it, can be connected fluidically to a low pressure line 113 and, via a nonreturn valve 114 blocking toward it, can be connected fluidically to a high pressure line 115. A low pressure hydraulic reservoir 116 is connected to the low pressure line, and a high pressure reservoir 118 secured by a reservoir loading valve 117 is connected to the high pressure line. Thus, as the piston rod 28 moves out and the displacement chamber 110 enlarges, pressure medium from the low pressure hydraulic reservoir can flow into the displacement chamber 110 via the nonreturn valve 112 and the line 111. When the piston rod 28 moves in, pressure medium is displaced from the displacement chamber into the high pressure hydraulic reservoir via the line 111 and the nonreturn valve 114. The piston rod 28 can therefore be viewed as the displacement element and the cylinder housing 36 as the housing of a plunger pump, which is designated overall by the reference number 120 and whose suction valve is the nonreturn valve 112 and whose pressure valve is the nonreturn valve 114.

The cylinder chambers 16, 29 and 39 of the piston-cylinder units 12, 24 and 25 are open fluidically to each other in the exemplary embodiments according to FIGS. 5 and 6, so that an interchange of pressurized liquid can take place between them unimpeded in every operating phase. The cylinder chambers 17 of the piston-cylinder units 12 can be connected fluidically via an electromagnetically operated 2/2-way valve 43 with a seat to the cylinder chamber 30 of the piston-cylinder unit 24 and, via a further electro-magnetically operated 2/2-way valve 108 with a seat, to the cylinder chamber 40 of the piston-cylinder unit 25. In the rest position of the two valves 43 and 108, the cylinder chambers 17 are blocked off in a leak-free manner with respect to the cylinder chambers 30 and 40. The pressure prevailing in the cylinder chambers 16 in this case acts in a closing manner on the valve elements of the valves 43 and 108.

Finally, there is a third electromagnetically operated 2/2-way valve 121 with a seat, which is connected between the cylinder chambers 16 and the cylinder chambers 17 of the piston-cylinder units 12. When all three valve's 43, 108 and 121 are located in their open position, the cylinder chambers 29, 30, 39 and 40 of the piston-cylinder units 24 and 25 are connected fluidically to one another via said valves.

The two piston rods 28 and 38 of the two exemplary embodiments according to FIGS. 5 and 6 can be firmly connected to each other via a coupling device 45, which is now constructed as a switchable magnetic coupling. To this end, a disk is fixed to the piston rod 38, outside the piston rod 28 and corresponds to the disk 35 from FIGS. 1 to 4, carries an electrical winding and can be held on the cover 33 of the piston rod 28 by magnetic force. Thus, the piston rod 28 can be carried along with a form fit in one direction by the disk 35 as a result of contact between the disk and the cover 33. In the other direction, it is possible for the piston rod 28 to be carried along by the disk on account of the magnetic force when the electromagnet is switched on.

The two exemplary embodiments according to FIGS. 5 and 6 each comprise an electric-motor drive 50, which is arranged as in the exemplary embodiments according to FIGS. 1 and 3. In the exemplary embodiment according to FIG. 6, as in the exemplary embodiment according to FIG. 2, the electric motor 51 is used only to drive a movable element of the closing unit of a plastic injection molding machine. Accordingly, the electric-motor drive 50 of the exemplary embodiment according to FIG. 6 comprises an electric motor 51 which is constructed as a hollow shaft motor with a hollow shaft 58 which accommodates only one threaded spindle 54 connected to the piston rod 38. On the inside, the hollow shaft 58 is provided with a trapezoidal thread or a ball roller thread. The threaded spindle 54, secured against rotation, bears an appropriate thread on the outside and via the latter is coupled to the hollow shaft 58.

In the exemplary embodiment according to FIG. 5, on the other hand, the electric motor 51, as in the exemplary embodiment according to FIG. 3, is also used for the linear and rotary drive of the screw 140 of an injection unit. The screw 140 located inside a plasticizing cylinder 65 is a constituent part of an injection shaft 66, which comprises a splined shaft 67 with spline grooves. Seated on the splined shaft 67 is the gear 73, which engages with splines in the spline grooves of the splined shaft 67. The splined shaft 67 is therefore firstly coupled with the gear 73 so as to be secure against rotation but, on the other hand, can be displaced axially toward the gear 73 held axially in a fixed location. Via the gear 73, therefore, the screw 140 can again be driven in rotation irrespective of its axial position.

The electric motor 51 in the exemplary embodiment according to FIG. 5, as in the exemplary embodiment according to FIG. 3, has a rotating hollow shaft 58 in order that a threaded spindle 55 which, together with a spindle nut 57 forms a screw drive, can dip in in a manner saving overall length. The threaded spindle 55 is again secured against rotation. The spindle nut 57, on the other hand, is the output element of a switching coupling 53 and, the latter and the hollow shaft 58, can be driven in rotation by the electric motor 51. The input element of the switching coupling 53 forms a coupling disk 63 which, close to the end of the hollow shaft at which the threaded spindle 55 projects, is guided on the hollow shaft 58 such that it can be displaced axially but is fixed against rotation. The spindle nut 57 is located on one side of the coupling disk 63, in front of the end of the hollow shaft, and there engages in the threaded spindle 55. The screw 140 can be moved axially via the threaded spindle 55.

On the other side of the coupling disk 63, a gear 94 is mounted on the hollow shaft 55 such that it is axially stationary but can rotate and which is the output element of a third switching coupling 95 which, as input element, has the same disk 63 as the switching coupling 53 or a second disk 63. The gear 94, viewed in the direction of the axes 23 and 11, is exactly at the height of the gear 73. The two gears 73 and 94 are coupled to each other via a toothed belt 96. The diameter of the gear 94 is greater than that of the gear 73, so that an increase in speed is obtained.

Between the threaded spindle 55 and the splined shaft 67, a hydraulic force multiplier 80 is also inserted in the exemplary embodiment according to FIG. 5, appears in the same way as in the exemplary embodiment according to FIG. 1 and has a piston-cylinder unit 81 with a input piston constructed as a differential piston 83 and fixed to the spindle 55 via a piston rod 84, and a piston-cylinder unit 82 with an output piston constructed as a differential piston 85. The cylinder chamber 87 is located on one side of the hydraulic piston 83, and the cylinder chamber 90 is located on the other side. The hydraulic piston 85 adjoins the cylinder chamber 88, which is connected fluidically to the cylinder chamber 87, and adjoins the cylinder chamber 91, which is connected fluidically to the cylinder chamber 90.

The drive mechanism according to FIG. 5 has still more hydraulic cylinders for secondary movements, as they are known. The figure shows an ejector cylinder 125, which is fixed to the movable mold clamping plate 10, a die moving cylinder 126, with which the entire injection assembly and therefore also the injection die can be moved up to the fixed mold clamping plate 9 and away from the latter, and a core traction cylinder 127. The direction and speed of these hydraulic cylinders can in each case be controlled by a proportionally adjustable 4/3-way valve 128. In this case, pressure medium flows to them from the high pressure hydraulic reservoir 118. The pressure medium source for these hydraulic loads 125, 126 and 127 is thus ultimately the plunger pump 120. Pressure medium displaced from the hydraulic cylinders flows back to the low pressure hydraulic reservoir 116.

In order to be able to produce a certain back pressure therein during the plasticizing of plastic, the exemplary embodiment according to FIG. 5 also has a back-pressure cylinder 130 constructed as a differential cylinder. This is fitted coaxially to the piston-cylinder unit 82 and has a differential piston 131 with a piston rod 132 which projects into the piston-cylinder unit 82 and in the latter is fixed to the hydraulic piston 85. The differential piston 131 divides the interior of the hydraulic cylinder 130 into an annular cylinder chamber 133 on the side of the piston rod and into a circularly cylindrical cylinder chamber 134 on the side remote from the piston rod. The hydraulic cylinder 130 can also be controlled by a proportionally adjustable directional control valve 128 which, on one side, is connected to the high pressure hydraulic reservoir 118 and, on the other side, is connected to the low pressure hydraulic pressure 116. If in this case only a restricted discharge of pressure medium from the cylinder chamber 134 is permitted, then a back pressure greater than atmospheric pressure builds up. If, on the other hand, the cylinder chamber 133 has pressure applied to it, the back pressure can be made lower than atmospheric pressure.

In addition, the exemplary embodiment according to FIG. 6 has an ejector cylinder 125, a die moving cylinder 126 and a core traction cylinder 127, each of which can be connected fluidically via a directional control valve 128 to the high pressure hydraulic reservoir 118 and the low pressure hydraulic reservoir 116. Differing from the exemplary embodiment according to FIG. 5, the piston-cylinder unit 82 is not arranged with a further piston-cylinder unit in a closed hydraulic circuit. The piston-cylinder unit 82 having the differential piston 85 separating the two cylinder chambers 88 and 91 can instead be controlled via a further proportionally adjustable directional control valve 128 and can be connected fluidically to the hydraulic reservoirs 116 and 118. The hydraulic piston 85 is aligned with the plasticizing and injection screw 140 located in the plasticizing cylinder 65. Between said screw and the hydraulic piston 85, the following further parts or components are arranged, forming an axially displaceable injection shaft 66 with the hydraulic piston and the screw. A piston rod 86 fixed to the hydraulic piston 85 and projecting from the cylinder housing 82 is followed by an axial bearing 145, the latter by a splined shaft 67, that by a threaded spindle 141 and the last by a freewheel 142. The axial bearing 145 permits the splined shaft 67 to rotate without co-rotation of the piston rod 86.

As in the exemplary embodiment according to FIG. 1, a small electric standard motor 71 with speed control is arranged on the side of splined shaft 67 and threaded spindle 141 and bears on its shaft a pinion 72, which is coupled via a toothed belt 96 with a gear 73 which is seated on the splined shaft 14, has a larger diameter and is mounted such that it is fixed axially but can rotate. The gear 73 engages with splines in the spline grooves of the splined shaft 67. The splined shaft 67 is therefore on the one hand coupled in a rotationally secure manner to the gear 73 but, on the other hand, can be displaced axially toward the gear held axially stationary. The screw can therefore be driven in rotation by the electric motor 71, irrespective of its axial position.

The threaded spindle 141 interacts with a spindle nut 143, which is mounted so as to be axially stationary but able to rotate and which can be blocked against rotation by a brake 144.

In FIGS. 5 and 6, the part of the drive mechanism for the movable mold clamping plate 10 is shown in a state in which the mold of a plastics injection molding machine is open. If the mold is then to be closed, then the electric motor 51 is controlled in such a way that the hollow shaft 58 rotates in a direction such that the threaded spindle 54 moves further into the hollow shaft. In this case, the coupling 52 is engaged in the exemplary embodiment according to FIG. 5. In addition, the magnetic coupling 45 is active. The threaded spindle 54 displaces the piston rod 38 together with hydraulic piston 37 and, via the magnetic coupling 45, the hydraulic piston 27 as well. The valves 43 and 108 are open. The valve 121 is closed. Pressurized liquid is displaced out of the cylinder chambers 30 and 40 and into the cylinder chambers 17 of the piston-cylinder units 12, so that the piston rods 15 of the hydraulic pistons 14 move in and the mold clamping plate 10 moves in the closing direction. The movement of the mold clamping plate 10 is fast since, because of the large active surface 32 of the hydraulic piston 27, a large amount of pressurized liquid is displaced from the cylinder chamber 30. The pressurized liquid displaced from the cylinder chamber 16 as the piston rods 15 of the hydraulic pistons 14 move in is accommodated by the cylinder chambers 29 and 39 without any increase in pressure. During the movement of the piston rod 28, the displacement chamber 110 enlarges, so that pressure medium flows to it from the low pressure hydraulic reservoir 116, in which a pressure of up to 10 bar, for example, prevails.

When the mold is closed, the valve 43 closes, so that the pressurized liquid in the cylinder chamber 30 is blocked in. In addition, the magnetic coupling 45 is switched off. Only the hydraulic piston 37 with the small active surface 42 is then displaced and, as a result, a high pressure builds up in the cylinder chambers 17, which produces a high closing force for the mold on the active surfaces 19 of the hydraulic pistons 14. After the high pressure has built up, the valve 108 is closed, so that this high pressure is maintained even if the screw drive is not self-locking and no supporting force is applied by the electric motor 51.

In order to open the mold, first of all the valve 108 is opened. The electric motor 51 is driven in the opposite direction of rotation so that the threaded spindle 54 moves out of the again into the hollow shaft 58. In the process, firstly only the hydraulic piston 37 is carried along and, in the process, the pressurized liquid in the cylinder chambers 17 is decompressed. The valve 43 is then also opened. When the disk 35 then strikes the piston rod 28, both hydraulic pistons 27 and 37 move back and displace pressurized liquid out of the cylinder chambers 29 and 39 into the cylinder chambers 16, so that the hydraulic pistons 14 move the piston rods 15 out and bring the movable mold clamping plate 10 into the open position. Since, in the process, a displacement chamber 110 is reduced in size, pressure medium contained in it is displaced via the nonreturn valve 114 into the high pressure hydraulic reservoir 118. Each machine cycle therefore also means one cycle of the plunger pump 120.

In the two exemplary embodiments according to FIGS. 5 and 6, the high pressure occurs on average in the cylinder chambers 17, 30 and 40 on the side of the piston rod. Internal leakage will therefore take place from the cylinder chambers on the side of the piston rod into the cylinder chambers 16, 29 and 39 on the side remote from the piston rod. As a result, the second and the third hydraulic pistons 27 and 37 will drift during operation with the effect of a gradual reduction in the size of the cylinder chambers 30 and 40 on the side of the piston rod. This drift is regularly compensated. To this end, the movable mold clamping plate 10 is moved into a completely opened position as far as a mechanical stop. The valve 121 is then opened, whereupon the hydraulic pistons 27 and 37 are moved into the position corresponding to the fully opened mold clamping plate 10. The valve 121 is then switched into its blocking position again. The adjustment is completed.

In order to plasticize plastic granules, in the exemplary embodiment according to FIG. 5 the switching coupling 95 is actuated and the electric motor 51 is driven in rotation in one direction. The gear 94 is driven in rotation via the coupling disk 63, and the screw 140 is driven in rotation via the toothed belt 96 and the gear 73. As a result, plastic material is delivered in front of the end of the screw. A back pressure is produced there, which leads to a reverse movement of the screw and of the hydraulic piston 85 with the effect of reducing the size of the cylinder chamber 88. Pressurized liquid is displaced from the cylinder chamber 88 via the line 89 into the cylinder chamber 81 and, as a result, the hydraulic piston 83 including threaded spindle 55 or rack 99 is displaced. This takes place with the switching coupling 53 disengaged. Without any further measures, the back pressure would be undefined. A desired back pressure is set by the back-pressure cylinder 130 by means of appropriate drive of the associated directional control valve 128. The back pressure may be registered, for example, by means of a measurement of the pressure prevailing in the cylinder chambers 133 and 134 of the back-pressure cylinder.

In order to inject plastic into the mold, the switching coupling 95 is disengaged and the switching coupling 53 is actuated. The electric motor 51 is driven in rotation in a direction such that the threaded spindle 55 moves the piston rod 84 into the cylinder housing of the piston-cylinder unit 81. The hydraulic piston 83 displaces pressurized liquid out of the cylinder chamber 87 via the line 89 into the cylinder chamber 88. As a result, the output piston 85 of the force multiplier 80 and, with it, the injection shaft 66 together with the screw 140 is moved to the left, in the view according to FIG. 6. In the process, the back-pressure cylinder 130 can act in a supportive manner, for which purpose its cylinder chamber 134 is connected to the high pressure hydraulic reservoir 118 via the associated directional control valve 128, and its cylinder chamber 133 is connected to the low pressure hydraulic reservoir.

In the exemplary embodiment according to FIG. 6, in order to plasticize plastic, the screw 140 is driven via the splined shaft 67 and the active freewheel coupling 142 by the electric motor 71 rotating in a first direction. As a result plastic compound is delivered into the space in front of the end of the screw. The spindle nut 143 can rotate freely. The screw 140 and, with the latter, the entire injection shaft 66 and the hydraulic piston 85 are loaded rearward, in the direction of the arrow A, by the back pressure building up in the space in front of the screw. A specific level or a specific level profile is desired for the back pressure. For this purpose, a specific pressure is maintained in the cylinder chamber 88, regulated via the directional control valve 128 associated with the piston-cylinder unit 82.

Once sufficient plastic has been plasticized, the direction of rotation of the electric motor 71 is reversed. The brake 144 drops in and blocks the spindle nut 143 against rotation. As a result of the rotation of the electric motor 71, the threaded spindle 141 then moves axially forward. The screw 140 is moved axially without any rotational movement, because of the freewheel coupling not yet being active. During this time, the cylinder chamber 88 of the piston-cylinder unit 82 is connected to the high pressure hydraulic reservoir 118 via the directional control valve 128, and the cylinder chamber 91 is connected to the low pressure hydraulic reservoir 116. As a result of the force consequently acting on the hydraulic piston 85, the screw drive between the threaded spindle 141 and the spindle nut 143 and the electric motor 71 are relieved of load. The latter determines the speed of the axial movement and therefore the injection pressure. The force exerted by the hydraulic cylinder is preferably smaller than the force necessary for the injection, so that the electric motor 71 acts as a drive. If the force exerted by the hydraulic cylinder 82 is too great, then the electric motor 71 has to brake.

It is easy to see that the construction of the injection assembly according to FIG. 6 with an electric motor by which the screw is rotated in order to plasticize plastic and which, during injection, provides fine control of the axial movement of the screw with hydraulic support is advantageous even in the case of a completely different drive mechanism for the closing unit than that shown in FIG. 6. In addition, the piston-cylinder unit 82 could also be supplied with pressure medium by a conventional hydraulic assembly having an axial piston pump or a radial piston pump.

In the exemplary embodiment according to FIG. 6, differing from that according to FIG. 5, the plasticizing of plastic and the opening or closing of the mold are possible in a manner parallel with one another in time. Couplings are dispensed with.

Figure 7:
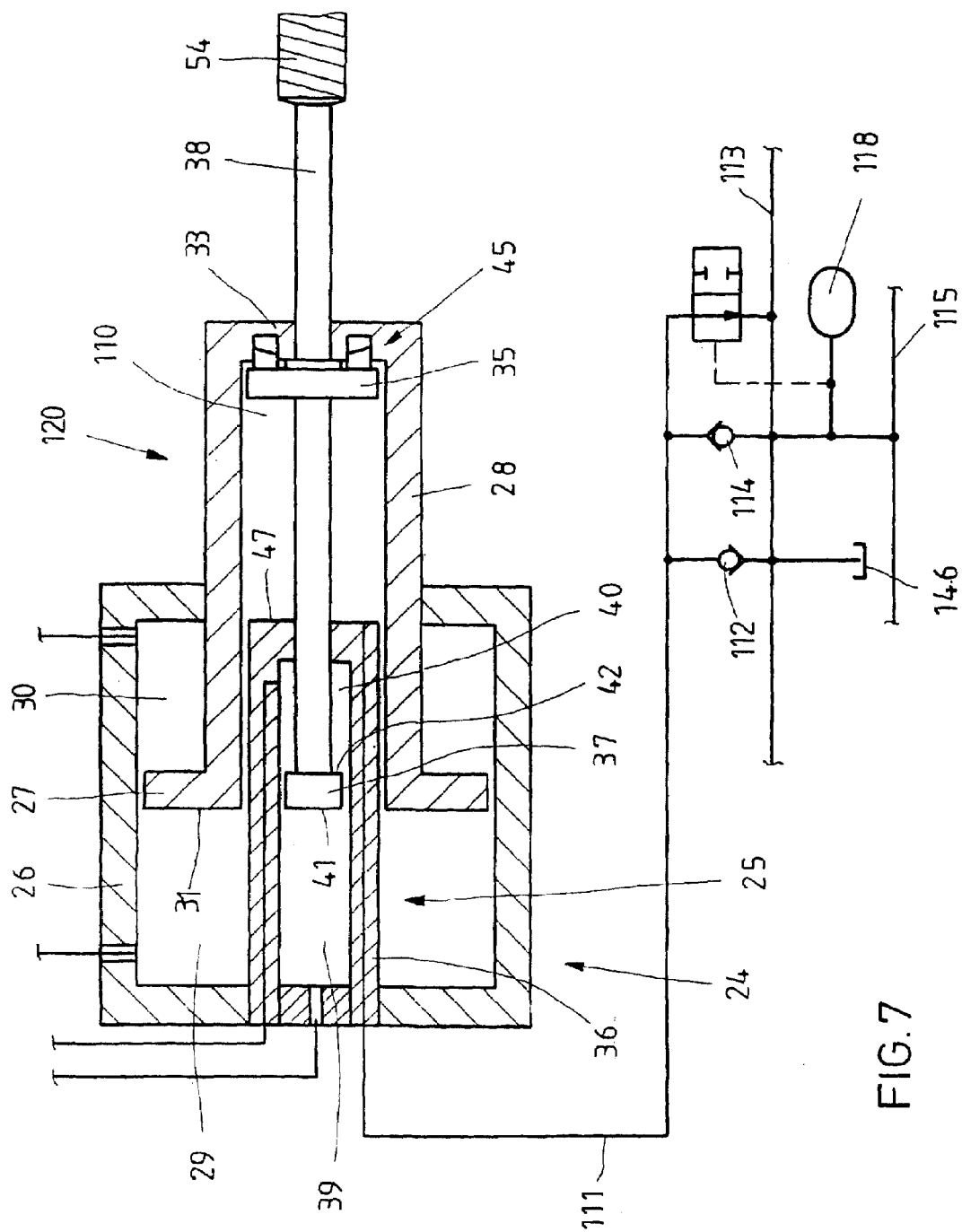
FIG. 7 shows a seventh exemplary embodiment which, with regard to the active direction of the second hydraulic piston and of the third hydraulic piston, corresponds to the exemplary embodiment according to FIG. 1 and additionally has a plunger pump.

The integration of a plunger pump 120 into the structural unit comprising the two piston-cylinder units 24 and 25 is possible, as the exemplary embodiment according to FIG. 7 shows, even when the active direction of the hydraulic pistons 27 and 37 is the same as that from the exemplary embodiments of FIGS. 1 to 4. In the exemplary embodiment according to FIG. 7, the hydraulic pistons 27 and 37 are therefore displaced with the effect of reducing the size of the cylinder chambers 29 and 39 in order to close a mold. The fluidic connections between the cylinder chambers 29 and 39 and the cylinder chambers of a closing cylinder are the same as those from FIGS. 1 to 4. The design construction of the structural unit comprising the two piston-cylinder units 24 and 25 from FIG. 7 is largely the same as that from FIGS. 1, 2 or 3, so that reference can be made here to the corresponding description parts and only the differences need to be explained.

The piston rod 38 of the hydraulic piston 37 is extended in the direction of the electric motor (not shown) beyond the disk 35 located within the piston rod 28, so that the threaded spindle 54 only begins at a distance from the disk 35. The diameter of the piston rod 38 on one side of the disk 35 is exactly the same as on the other side. In addition, the piston rod 28, as in the exemplary embodiments according to FIGS. 5 and 6, is of bush-like construction and is provided with a base, which corresponds to the collar 33 from FIG. 1 and is therefore provided with the same reference number and through which the piston rod 28 passes in a sealed manner. As a result, a closed chamber is produced within the piston rod 28, axially between its base 33 and the end 47 of the cylinder housing 36, its volume changing in the event of a displacement of the hydraulic piston 27. The chamber is filled with pressure medium and forms a displacement chamber 110 of a plunger pump 120. To the displacement chamber 110, partly through the cylinder housing there leads a line 111, which can be connected to a low pressure line 113 via a nonreturn valve 112 opening toward it and, instead of a low pressure hydraulic reservoir as in FIGS. 5 and 6, can be connected fluidically to a tank 146 and via a nonreturn valve 114 blocking toward it, to a high pressure line 115 and a high pressure hydraulic reservoir 118. In the event of a displacement of only the hydraulic piston 37, the volume of the displacement chamber 110 does not change, since the piston rod 28 has the same diameter on both sides of the disk 35.

The disk 35 is part of a magnetic coupling 45, whose electric winding is let into the base 33 of the piston rod 28. During the closure of the mold of a plastics injection molding machine, the magnetic coupling is active, so that as the piston rod 38 moves into the cylinder housing 36, the piston rod 28 and therefore the hydraulic piston 27 are carried along. When the mold is closed, the magnetic coupling is switched off and only the hydraulic piston 37 is moved onward in order to build up the high holding pressure. When the mold is opened, as the hydraulic piston 37 is moved back, the disk 35 strikes the inside of the base 33. The hydraulic piston 27 is then carried along positively.

Figure 8:
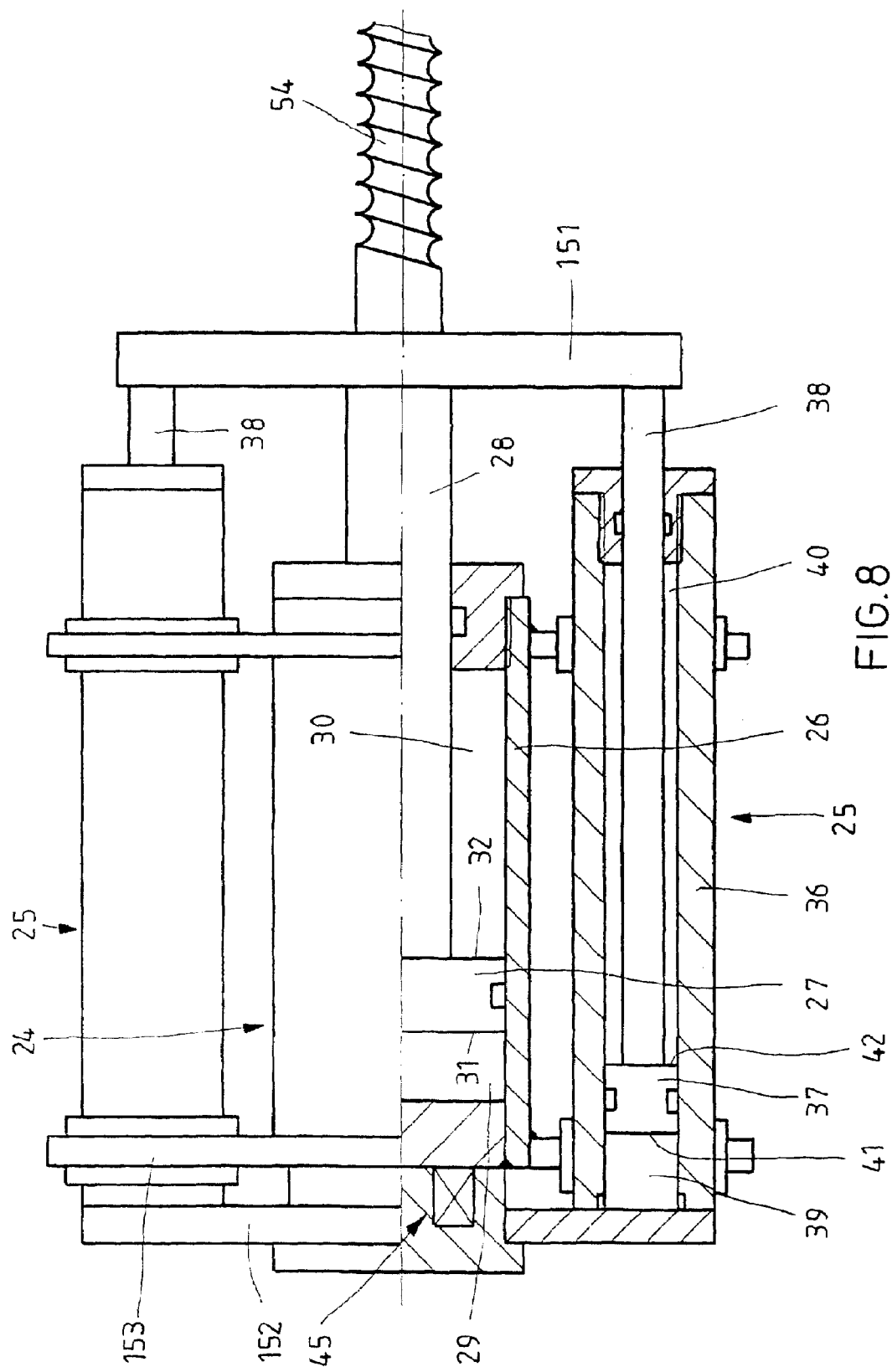
FIG. 8 shows an eighth exemplary embodiment, in which, as compared with the exemplary embodiments according to FIGS. 5 to 7, there has been a kinematic reversal.

FIG. 8 shows a further embodiment of the piston-cylinder units 24 and 25 with a magnetic coupling 45, the latter now not being located between hydraulic pistons that can be moved differently by the drive motor but between the associated cylinder housings. While in the exemplary embodiments according to FIGS. 5 to 7 the two cylinder housings 26 and 36 are arranged in a fixed location with respect to the machine frame and, during the force stroke, the high pressure is built up by the hydraulic piston 27 remaining at rest relative to its cylinder housing 26 and only the hydraulic piston 37 being moved onward, in the exemplary embodiment according to FIG. 8 one cylinder housing can be moved together with the associated hydraulic piston after the magnetic coupling 45 has been released, so that there is no longer any change in the volume of the corresponding pressure chambers. The principle of reducing the size of the total displacement space by there being no more relative movement between one hydraulic piston and the associated cylinder housing after a coupling has been switched, is the same in the exemplary embodiments according to FIGS. 5 to 8. To this extent, the mode of action of the exemplary embodiment according to FIG. 8 merely represents a kinematic reversal of the mode of action of the exemplary embodiments according to FIGS. 5 to 7.

One clear difference between the exemplary embodiment according to FIG. 8 and the exemplary embodiments according to FIGS. 5 to 7 also consists in the fact that, according to FIG. 8, the cylinder-piston units 24 and 25 are implemented in a more resolved design, are not arranged concentrically with one another and in that there are a plurality of piston-cylinder units 25, in particular two, whose plurality is located symmetrically with respect to a piston-cylinder unit 24.

In detail, the piston-cylinder unit 24 is a single differential cylinder with the cylinder housing 26 and the differential piston located therein as hydraulic piston 27, from which the piston rod 28 extends on one side. The hydraulic piston 27 adjoins the pressure chamber 30 on the side of the piston rod with the annular active surface 32 and, on the side remote from the piston rod, adjoins the pressure chamber 29 with the active surface 31 in the shape of a circular disk. Diametrically opposite each other with respect to the piston-cylinder unit 24 there are two piston-cylinder units 25, each of which is likewise a simple differential cylinder with a cylinder housing 36 and with a differential piston as hydraulic piston 37. From the latter, the piston rod 38 in each case extends on one side. Each hydraulic piston 37 adjoins the pressure chamber 40 on the side of the piston rod with the annular active surface 42 and, on the side remote from the piston rod, adjoins the pressure chamber 39 with the active surface 41 shaped like a circular disk. The three piston rods are firmly connected to one another via a cross member 151 and are connected to a threaded spindle 54 which can be moved by a drive motor, not specifically shown. As a result of the non-concentric arrangement of the piston-cylinder units 24 and 25, the threaded spindle is secured against rotation.

The cylinder housing 26 is provided with lugs 153, with which it is guided longitudinally on the cylinder housings 36. In front of the bottom of the cylinder housing 26, a support 152, to which electrical parts of the magnetic switching coupling 45 are fixed, extends from cylinder housing 25 to cylinder housing 25. In its one switching state, said magnetic switching coupling 45 is able to hold the cylinder housing 26 firmly, so that the latter is fixed in location with respect to the machine frame, like the cylinder housing 36. In another state of the magnetic coupling 45, the cylinder housing 26 can be moved along the cylinder housing 36. In the exemplary embodiment according to FIG. 8, substantial parts of the magnetic coupling 45 are therefore arranged in fixed locations.

In a drive mechanism having second and third piston-cylinder units 24 and 25 according to FIG. 8, the magnetic coupling 45 is active during the closure of the mold of a plastics injection molding machine, so that when the piston rods 28 and 38 move out, apart from the cylinder housings 36, the cylinder housing 26 is also at rest. Pressurized liquid is displaced from the pressure chambers 30 and 40 into the cylinder chambers 37 according to FIGS. 5 and 6, so that the piston rods 15 of the hydraulic pistons 14 move in and the mold clamping plate 10 moves in the closing direction. The movement of the mold clamping plate 10 is rapid since, because of the large active surface 32 of the hydraulic piston 27, a great deal of pressurized liquid is displaced from the cylinder chamber 30. The pressurized liquid displaced from the cylinder chamber 16 as the piston rods 15 of the hydraulic pistons 14 move in is accommodated by the cylinder chambers 29 and 39 without any increase in pressure.

When the mold is closed, the valve 43 from FIG. 5 or 6 closes, so that the pressurized liquid in the cylinder chamber 30 is blocked in. In addition, the magnetic coupling 45 is switched off. The cylinder housing 26 is then moved together with the hydraulic piston 27 without the pressure in the pressure chamber 30 changing. Only the two hydraulic pistons 37 with the small active surfaces 42 are still active, so that with limited loading on the threaded spindle 54 and the drive motor, a high pressure is built up in the cylinder chambers 17, and produces a high closing force for the mold on the active surfaces 19 of the hydraulic pistons 14. After the high pressure has been built up, the valve 108 is closed, so that this high pressure is maintained even if the screw drive is not self-locking and no supporting force is applied by the drive motor.

In order to open the mold, first of all the valve 108 is opened. The drive motor is driven in the opposite direction of rotation and, together with the hydraulic pistons 27 and 37, moves to the left as viewed in FIG. 8. In the process, first of all the cylinder housing 26 is brought up to the support 152 while the pressurized liquid in the cylinder chambers 17 is decompressed, and then remains at rest together with the cylinder housings 36. The valve 43 is then also opened. All three hydraulic pistons 27 and 37 are then moved relative to the cylinder housings and, as a result, bring the movable mold clamping plate 10 into the open position.

Before the next closing stroke, the magnetic coupling 45 is switched on again.

I claim:

1. A drive mechanism, particularly for a movable component (10, 66) of a closing unit, an injection unit or ejector unit of a plastics injection molding machine, comprising
   an output element (54) movable in a straight line and an electric-motor drive unit (50) having an electric motor (51), and
   at least a first piston-cylinder unit (12), which has a first cylinder housing (13) and a first hydraulic piston (14) which, with a first active surface (18, 19), bounds a first cylinder chamber (16, 17) filled with pressurized liquid and lies in a force chain between the output element (54) of the electric-motor drive unit (50) and movable component (10, 66),
   a second piston-cylinder unit (24), which has a second cylinder housing (26) and a second hydraulic piston (27) which, with a second active surface (31, 32), bounds a second cylinder chamber (29, 30) filled with pressurized liquid,
   a third piston-cylinder unit (25), which has a third cylinder housing (36) and a third hydraulic piston (37) which, with a third active surface (41, 42) bounds a third cylinder chamber (39, 40) filled with pressurized liquid and whose active surface (41, 42) is substantially smaller than the first active surface (18, 19) and the second active surface (31, 32),
   a fluidic connection between the first cylinder chamber (16, 17) and the second cylinder chamber (29, 30) is controlable via a valve (43), and wherein
   when the valve (43) is open, the second hydraulic piston (27) is movable by the electric motor (51) via the output element (54) for an actuating movement of the movable component (10, 66) with effect of displacing pressurized liquid out of the second cylinder chamber (29, 30) into the first cylinder chamber (16, 17) and, to exert a high force on the movable component (10, 66), when the valve (43) is closed, the third hydraulic piston (37) is displacable with effect of displacing pressurized liquid out of the third cylinder chamber (39, 40) into the first cylinder chamber (16, 17).

2. The drive mechanism as claimed in claim 1, wherein the valve (43) is a valve with a seat, by which the first cylinder chamber (16, 17) is shutable off in a leak-free manner with respect to the second cylinder chamber (29, 30).

3. The drive mechanism as claimed in claim 1, wherein the second piston-cylinder unit (24) and the third piston-cylinder unit (25) are combined to form a structural unit that can be handled jointly.

4. The drive mechanism as claimed in claim 3, wherein the third hydraulic piston (37) is displacable by the electric motor (51) via a rod (38) which runs in a hollow component (28) via which the second hydraulic piston (27) is displacable by the electric motor (51), wherein the second piston-cylinder unit (24) has an annular cylinder (26, 36) and an annular piston (27) located therein, and the third hydraulic piston (37) is displacable through the annular piston (27) by the electric motor (51), and wherein the third piston-cylinder unit (25) is inside the second piston-cylinder unit (24).

5. The drive mechanism as claimed 1, wherein the first hydraulic piston (14) is movable in two opposite directions by the electric motor (51).

6. The drive mechanism as claimed in claim 5, wherein the first hydraulic piston (14) is a differential piston with first annular cylinder chamber (17) divided off by the first active surface (18), the second hydraulic piston (27) is a differential piston with second annular cylinder chamber (30) divided off by the second active surface (31), and the annular cylinder chambers (17, 30) are fluidically open to each other, and wherein the third hydraulic piston (37) is a differential piston with third annular cylinder chamber (40) divided off by the third active surface (41), which is fluidically open to the first and second annular cylinder chambers (17, 30).

7. The drive mechanism as claimed in claim 5, wherein the first hydraulic piston (14) is a differential piston with first annular cylinder chamber (17) bounded by the first active surface (19) and the first cylinder chamber (16) divided off by the first active surface (19), the second hydraulic piston (27) is a differential piston with second annular cylinder chamber (30) bounded by the second active surface (32) and the cylinder chamber (29) divided off by the second active surface (32), and the first and second cylinder chambers (16, 29) divided off by the first and second active surfaces (19, 32) are fluidically open to each other, and wherein the third hydraulic piston (37) is a differential piston with third annular cylinder chamber (40) bounded by the third active surface (42) and cylinder chamber (39) divided off by the third active surface (42), which is fluidically open to the first and second cylinder chambers (16, 29) divided off by the first and second active surfaces (19, 32).

8. The drive mechanism as claimed in claim 1, wherein by a displacement element (28) that is movable together with the second hydraulic piston (27), pressurized fluid is displacable via a pressure valve (114) from a displacement chamber (110) into a high pressure hydraulic reservoir (118) and is suckable in via a suction valve (112) from a pressurized fluid low pressure container (116, 146), and between at least one hydraulic load (125, 126, 127, 130, 82) the high pressure hydraulic reservoir (118) and the pressurized fluid low pressure container (116, 146), the pressurized fluid paths are controllable via a directional control valve (128).

9. The drive mechanism as claimed in claim 8, wherein the second hydraulic piston (27) is a hollow piston with a hollow, bush-like piston rod (28) into which the third cylinder housing (36) of the third piston-cylinder unit (25) projects, and the displacement chamber (110) is located axially between the cylinder housing (36) and a base (33) of the piston rod (28) of the second hydraulic piston (27).

10. The drive mechanism as claimed in claim 8, wherein the pressurized fluid low pressure container (116, 146) is a low pressure hydraulic reservoir (116).

11. The drive mechanism as claimed in claim 1, wherein the output element (54) of the electric-motor drive unit (50) and the third hydraulic piston (37) are firmly connected to each other, at least with respect to a movement in axial direction, wherein there is a coupling device (45), which is arranged between a part (27, 26) of the second piston-cylinder unit (24) and functionally identical part (37, 36) of the third piston-cylinder unit (25) and, in their one state, both the second and the third hydraulic pistons (27, 37) of both the second and the third piston-cylinder units (24, 25) are movable relative to the second and the third cylinder housings (26, 36) and, in their other state, only the third hydraulic piston (37) of the third piston-cylinder unit (25) is movable relative to the third cylinder housing (36).

12. The drive mechanism as claimed in claim 11, wherein the output element (54) of the electric-motor drive unit (50) and the third hydraulic piston (37) are firmly connected to each other, at least with respect to movement in the axial direction, there is said coupling device (45) by which, for an actuating movement of the movable component (10), the second hydraulic piston (27) and the third hydraulic piston (37) are coupled to each other in a fixed position, and so as to exert the high force, and wherein the fixed coupling between the second hydraulic piston (27) and the third hydraulic piston (37) is releasable.

13. The drive mechanism as claimed in claim 11, wherein the coupling device (45) comprises a spring (46), which is clamped in between the second hydraulic piston (27) and the third hydraulic piston (37), and wherein the second hydraulic piston (27) and the third hydraulic piston (37) are pressable axially against each other by the spring (46), and when the third hydraulic piston (37) and the second hydraulic piston (27) are in axial contact, a prestressing force of the spring (46) is greater than an actuating force required to execute the actuating movement.

14. The drive mechanism as claimed in claim 11, wherein the coupling device (45) is a magnetic coupling.

15. The drive mechanism as claimed in claim 1, wherein via a valve arrangement (43, 108, 121), two cylinder chambers (29, 30) on both sides of the second hydraulic piston (27) are connectable fluidically to each other, and two cylinder chambers (39, 40) on both aides of the third hydraulic piston (37) are connectable fluidically to each other.

16. The drive mechanism as claimed in claim 15, wherein the valve arrangement has a valve (121) via which the two cylinder chambers (16, 17) on both sides of the first hydraulic piston (14) are connectable fluidically directly to each other.

17. The drive mechanism, as claimed in claim 1, wherein a movable component (10) of the closing unit is drivable by the electric motor (51) via a first switchable coupling (52) lying in a first force chain, and a component (66) of the injection unit to be moved in order to inject plastic into a mold is drivable by the electric motor (51) via a second coupling (53) lying in a second force chain, and wherein the electric-motor drive unit (50) has a first output element (54, 107) that is movable in a straight line and a second output element (55, 99) that is movable in a straight line, and wherein to close the mold, the first output element (54, 107) is movable in a first direction via active first coupling (52) and, to inject plastic, the second output element (55, 99) is movable in same or in opposite direction via active second coupling (53).

18. The drive mechanism as claimed in claim 17, further comprises a screw drivable in rotation by the electric motor (51) via a third coupling (95).

19. The drive mechanism as claimed in claim 18, wherein when second coupling (53) is released, a back pressure in plasticized plastic material is settable by driving a hydraulic back-pressure cylinder (130), and wherein by a directional control valve (128), pressure medium paths between the back-pressure cylinder (130) and a high pressure hydraulic reservoir (118) and/or a low pressure storage container (116, 146) is controlable.

20. The drive mechanism as claimed in claim 1, wherein a screw (140) is movable axially by an electric motor (71) via a screw drive (141, 143), and there is a hydraulic cylinder (82) by which, at least during an injection operation, an additional axial force is exertable on the screw (140), wherein the hydraulic cylinder (82) is connectable to a hydraulic reservoir (118) via a directional control valve (128).

* * * * *